US012378431B2

(12) United States Patent
Scheerder et al.

(10) Patent No.: US 12,378,431 B2
(45) Date of Patent: Aug. 5, 2025

(54) PROCESS FOR PREPARING AQUEOUS POLYMER DISPERSIONS

(71) Applicant: Covestro (Netherlands) B.V., Geleen (NL)

(72) Inventors: Jurgen Scheerder, Buren (NL); Remy Paul Marie Dollekens, Den Bosch (NL)

(73) Assignee: Covestro (Netherlands) B.V., Geleen (NL)

( * ) Notice: Subject to any disclaimer, the term of this patent is extended or adjusted under 35 U.S.C. 154(b) by 455 days.

(21) Appl. No.: 17/916,218

(22) PCT Filed: Mar. 22, 2021

(86) PCT No.: PCT/EP2021/057232
§ 371 (c)(1),
(2) Date: Sep. 30, 2022

(87) PCT Pub. No.: WO2021/197883
PCT Pub. Date: Oct. 7, 2021

(65) Prior Publication Data
US 2023/0140735 A1 May 4, 2023

(30) Foreign Application Priority Data

Apr. 1, 2020 (EP) .................................... 20167609

(51) Int. Cl.
*C09D 7/42* (2018.01)
*C09D 5/02* (2006.01)
*C09D 125/14* (2006.01)

(52) U.S. Cl.
CPC ............ *C09D 125/14* (2013.01); *C09D 5/022* (2013.01); *C09D 7/42* (2018.01)

(58) Field of Classification Search
CPC ........ C09D 125/14; C09D 7/42; C09D 5/022; C09D 5/02; C09D 151/003; C08F 212/08; C08F 257/02; C08F 265/02; C08F 285/00; C08F 2/22
See application file for complete search history.

(56) References Cited

U.S. PATENT DOCUMENTS

| 4,151,143 A | 4/1979 | Blank et al. |
| 4,414,370 A | 11/1983 | Hamielec et al. |
| 5,744,540 A | 4/1998 | Baumstark et al. |

(Continued)

FOREIGN PATENT DOCUMENTS

| EP | 0156170 A1 | 10/1985 |
| EP | 0710680 A2 | 5/1996 |

(Continued)

*Primary Examiner* — Jiangtian Xu
(74) *Attorney, Agent, or Firm* — The Webb Law Firm

(57) ABSTRACT

A process for preparing an aqueous polymer dispersion including free-radically initiated emulsion polymerization in an aqueous medium, in the presence of at least one vinyl polymer A, to obtain a polymer B including a vinyl polymer phase B1 with a glass transition temperature of from −20 to +15° C. and a vinyl polymer phase B2 with a glass transition temperature of from +50 to +110° C., with the proviso that the difference in glass transition temperature between polymer B1 and polymer B2 is at least 40° C. The weight ratio of polymer B1 to polymer B2 is from 80:10 to 10:20.

64 Claims, 2 Drawing Sheets

(56) References Cited

U.S. PATENT DOCUMENTS

Figure 1:

| | | |
|---|---|---|
| 10,927,194 B2 | 2/2021 | Gaschler et al. |
| 2017/0240765 A1 | 8/2017 | Nabuurs et al. |
| 2019/0367644 A1 | 12/2019 | Nabuurs et al. |

FOREIGN PATENT DOCUMENTS

| | | | |
|---|---|---|---|
| EP | 1333047 A1 | 8/2003 | |
| WO | 8202387 A1 | 7/1982 | |
| WO | 9529963 A1 | 11/1995 | |
| WO | 2018015169 A1 | 1/2018 | |
| WO | WO-2019011693 A1 * | 1/2019 | ................ C08F 2/22 |

* cited by examiner

PROCESS FOR PREPARING AQUEOUS POLYMER DISPERSIONS

CROSS-REFERENCE TO RELATED APPLICATIONS

This application is the United States national phase of International Application No. PCT/EP2021/057232 filed Mar. 22, 2021, and claims priority to European Patent Application No. 20167609.5 filed Apr. 1, 2020, the disclosures of which are hereby incorporated by reference in their entirety.

BACKGROUND OF THE INVENTION

Field of the Invention

The present invention relates to the field of aqueous acrylic polymer dispersions useful in the preparation of coatings, in particular coatings for industrial applications. In particular, the present invention relates to a process for preparing aqueous binder compositions comprising acrylic polymer particles dispersed in an aqueous medium. The process comprises preparing a vinyl polymer B via free-radically initiated emulsion polymerization in an aqueous medium in the presence of at least one vinyl polymer A having a lower weight average molecular weight than polymer B.

Description of Related Art

In the coating industry there is a continuing need for coating compositions with a limited amount of coalescent that yield coatings with good resistances against a variety of chemicals and that exhibit good mechanical properties such as anti-blocking, pencil hardness and/or König hardness. This particular combination is challenging. The problem with the prior art one-component waterborne acrylic coating compositions is that these usually do not combine good chemical resistances such as water, ethanol, red wine, coffee, mustard and/or onion resistance and good mechanical properties such as anti-blocking, pencil hardness and/or König hardness in the resultant coatings, unless high glass transition temperature ($T_g$) binders are applied. High $T_g$ binders require high level of coalescent resulting in high VOC (volatile organic compound) levels and possible health and flammability risks and for most applications the level of allowable VOC is restricted. VOCs may be a health, a safety or an environmental hazard and may need to be mitigated or removed from coating systems. For example for industrial applications, such as coating of furniture, the VOC level permitted according to the European Union Directive 2004/42/EC Europe is below 130 g/l.

Further, the mechanical performance of one-component waterborne acrylic coating systems, in particular the coating hardness tends to be inferior to those of polyurethanes or two-component acrylic coating systems. However, for certain application areas polyurethanes are too expensive.

Two-component acrylic coating systems comprise a first component and a second component each of which is separate and distinct from each other and wherein the first component comprises an acrylic polymer and the second component comprises a crosslinker like for example isocyanates. When a high level of chemical resistance is required, two-component acrylic coating systems are usually used. However, such systems use crosslinkers like isocyanates which are from a health, safety and environmental perspective undesired. For instance, isocyanates are known to trigger allergic responses. In addition, two-component coating systems have a limited pot life. Finally, the need for a crosslinker makes such binder systems more expensive.

An additional challenge is the potential drop in chemical resistances of coatings compositions upon matting and/or pigmentation. For glossy clear coatings one-component waterborne acrylic coating systems exist that give coatings with good chemical resistances. However, waterborne acrylic binders that provide good chemical resistances in clear coatings may show inferior chemical resistance performance in matted and/or pigmented coatings.

SUMMARY OF THE INVENTION

Surprisingly, we have now discovered that the combination of a vinyl polymer B with two phases (B1 and B2) with different glass transition temperature values and an acid functional vinyl polymer A with lower weight average molecular weight than vinyl polymer B, whereby the ratio of A:B, the ratio B11:B2, the $T_g$ of A, the $T_g$ of B1, the $T_g$ of B2 and the $T_g$ difference between $T_g$B1 and $T_g$ B2 are as defined herein allows to result in an unique combination of good chemical resistances in particular water, ethanol and coffee resistance and preferably also red wine, mustard and onion resistance in combination with good mechanical properties, in particular anti-blocking, pencil hardness and König hardness in clear glossy, clear satin, pigmented glossy and pigmented satin formulations at low VOC.

With the process of this invention aqueous polymer dispersions with low VOC can be made which can be used for preparing crack-free films which have at least good chemical resistance, in particular at least good water, ethanol and coffee resistance and preferably at least good red wine, mustard and onion resistance as well as good mechanical properties, in particular anti-blocking, pencil hardness and König hardness, and that while the drop in in particular the water, ethanol and coffee resistance and preferably also in red wine, mustard and onion resistance in pigmented and/or matted coating formulations is minimal or at least acceptable.

According to the present invention there is provided a process for preparing an aqueous polymer dispersion comprising at least three vinyl polymer phases, the process comprising
  a free-radically initiated emulsion polymerization in an aqueous medium, in the presence of at least one vinyl polymer A, to form a polymer B comprising a vinyl polymer phase B1 with a glass transition temperature of from −20 to +15° C. and a vinyl polymer phase B2 with a glass transition temperature of from +50 to +110° C., with the proviso that the difference in glass transition temperature between polymer B1 and polymer B2 is at least 40° C., wherein
the weight ratio of polymer B1 to polymer B2 is from 80:10 to 10:20,
the at least one polymer A is obtained by a process comprising:
  free-radically initiated bulk or solution polymerizing of:
    from 5 to 25 wt. % of at least one carboxylic acid functional ethylenically unsaturated monomer A1, and
    from 75 to 95 wt. % of at least one ethylenically unsaturated monomer A2 different than monomer A1, where the amounts are given relative to the total weight of monomers charged in the polymerization to prepare the vinyl polymer A, the glass transition temperature of the at least one vinyl polymer A is from 40 to 150° C., the weight average molecular weight of the at least one polymer A is from 1000 to 70000 g/mol, the weight average molecular weight of the polymer A is lower than the weight average molecular weight of the polymer B, and the weight ratio of polymer A to polymer B is from 10:90 to 40:60.

WO2018015169 describes polymer dispersions made of a polymer 2 with a Hansch parameter of ≥2.8 and a Tg of at least 20° C. prepared in the presence of a polymer 1 which contains from 3 to 35 wt. % of acid monomers with a Hansch parameter of >1.35. This polymer 1 can be prepared via bulk, solvent or emulsion polymerization. This patent publication teaches the use of these polymers for stain resistant coatings. EP1333047 describes aqueous ink binders that comprise a first polymer and a second polymer, which is prepared in presence of the first polymer. The first polymer contains from 15 to 75 wt. % of acid monomers, has a low molecular weight, a Tg of greater than 70° C. and a Hansch parameter between 1.3 to 2.1 and is prepared by bulk or solution polymerization. These binders are used for inks with water resistance and resolubility on the press. U.S. Pat. No. 4,151,143 describes the synthesis of a solution or bulk polymer followed by a dispersing step in water and a second polymerization step in aqueous environment. This patent described 2C stoving applications and does not teach the use of this concept for one-component binders for stain resistant and mechanically strong coatings. No specific preferences are given for the polymer phase.

We have now surprisingly found that by introducing a second high $T_g$ polymer phase into the higher weight average molecular weight polymer part of these binders, compared to polymer dispersion with a single $T_g$ polymer phase, a coating can be obtained with the same or even reduced amount of coalescent (and thus same or reduced VOC level of the coating) of which the anti-blocking property is enhanced and even in pigmented and/or matted coating formulations the chemical resistances remain good.

It has surprisingly been found that the VOC level in the coating formulations can be kept low, while a crack free coating with good mechanical properties, in particular König hardness, pencil hardness and blocking resistance, and good chemical resistances, in particular water, ethanol and coffee resistance, and preferably also red wine, mustard and onion resistance, can be obtained. Blocking resistance combats the tendency of coatings to stick together (or block). Poor anti-blocking properties cause the two contacting coatings to stick, resulting in tearing or peeling of the coatings upon separation. A high blocking resistance avoids potential coating damages when separating two coated surfaces that are stacked or placed in contact with one another during storage, packaging and/or shipping.

DETAILED DESCRIPTION OF THE INVENTION

The present invention further relates to an aqueous polymer dispersion obtained by or obtainable by the process as described above.

Accordingly, for the purposes of the invention an "aqueous polymer dispersion" means a dispersion of at least the polymers A, B1 and B2 in a liquid carrier medium of which water is the principle or only component. The invention dispersion will typically be in the form of an aqueous polymer latex and comprises colloidal dispersed particles in which polymer A, polymer B1 and polymer B2 are present. Other polymers may be present in the aqueous polymer dispersion of the invention. The amount of polymer A, polymer B1 and polymer B2 together in the aqueous polymer dispersion of the invention is preferably more than 60 wt. %, more preferably more than 70 wt. %, more preferably more than 80 wt. %, especially more than 90 wt. %., more especially more than 95 wt. % and most especially more than 97 wt. % based on the solids content of the aqueous polymer dispersion. The solids content is determined by evaporation of the volatile compounds such as water and optionally solvent and volatile amines present in the aqueous polymer dispersion.

The aqueous polymer dispersion of the invention can be advantageously used to obtain clear glossy, clear satin, pigmented glossy, pigmented satin target formulations as set forward in the experimental section of the description with the following properties:

1. VOC:

For clear glossy and clear satin target formulations as set forward in the experimental section of the description a VOC, calculated as described herein, of preferably 130 g/l, more preferably ≤120 g/l, even more preferably 110 g/l and most preferably 100 g/l; and For pigmented glossy and pigmented satin target formulations as set forward in the experimental section of the description a VOC, calculated as described herein, of preferably 130 g/l, more preferably 125 g/l, more preferably 120 g/l and most preferably 100 g/l; and 2. Chemical Resistances:

For clear glossy, clear satin, pigmented glossy, pigmented satin target formulations as set forward in the experimental section of the description the following chemical resistances:

(i) The resistance against 48% EtOH, 1 hour, is rated as 3, 4 or 5, preferably as 4 or 5 and most preferably as 5 when tested according to DIN 68861-11B:2011-01 (further referred herein as DIN 68861-1B); and The resistance against water, 16 hours, is rated as 3, 4 or 5, preferably as 4 or 5 and most preferably as 5 when tested according to DIN 68861-1B; and The resistance against coffee, 16 hours, is rated as 3, 4 or 5, preferably as 4 or 5 and most preferably as 5 when tested according to DIN 68861-1B; and The resistance against mustard, 6 hours, is preferably rated as 3, 4 or 5, more preferably as 4 or 5 and most preferably as 5 when tested according to DIN 68861-1B; and The resistance against red wine, 6 hours, is preferably rated as 3, 4 or 5, more preferably as 4 or 5 and most preferably as 5 when tested according to DIN 68861-1B; and The resistance against onions, 6 hours, is preferably rated as 3, 4 or 5, preferably as 4 or 5 and most preferably as 5 when tested according to DIN 68861-1B; and The cumulative resistance against 48% EtOH (1 hour), water (16 hours), coffee (16 hours), mustard (6 hours), red wine (6 hours) and onions (6 hours), is preferably 18 or higher, more preferably 21 or higher, more preferably 24 or higher, most preferably 27 or higher when tested according to DIN 68861-1B. More preferably, the cumulative resistance against 48% EtOH (1 hour), water (16 hours), coffee (16 hours), mustard (6 hours), red wine (6 hours) and onions (6 hours), is preferably 18 or higher, preferably 21 or higher, more preferably 24 or higher, even more most preferably 27 or higher when tested according to DIN 68861-1B, with none of the single resistance lower than 3; and/or (ii) The resistance against 48% EtOH (1 hour), water (24 hours), and coffee (1 hour) preferably passes IKEA R2 level as judged according to IOS-MAT-0066 version AA-163938-9, dd 17-01-2014, i.e. result ≥4; and 3. Mechanical Properties:

For clear glossy, clear satin, pigmented glossy, pigmented satin target formulations as set forward in the experimental section of the description the following mechanical properties:

The blocking as determined according to the method described herein using a load of 1 kg/cm2 is rated as 3, 4 or 5, preferably as 4 or 5 and most preferably as 5; and The blocking as determined according to the method described herein using a load of 3 kg/cm2 is rated as 3, 4 or 5, preferably as 4 or 5 and most preferably as 5; and The König hardness as determined according to the method described herein using a drying time of 24 hours at room temperature followed by 16 hours at 50° C. is at least 80, preferably at least 90 and most preferably at least 100 seconds; and The pencil hardness as determined according to the method described herein is preferably at least 2B and more preferably at least B.

For all upper and lower boundaries of any range given herein, the boundary value is included in the range given, unless specifically indicated otherwise. Thus, when saying from x to y, means including x and y and also all intermediate values.

Polymer A

The carboxylic acid functional ethylenically unsaturated monomer A1 are preferably selected from the group consisting of acrylic acid, methacrylic acid, β-carboxyethyl acrylate, citraconic acid, crotonic acid, fumaric acid, itaconic acid, monoalkyl esters of itaconic acid such as for example monomethyl itaconate, maleic acid, and potentially carboxylic acid functional olefinically unsaturated monomers such as itaconic anhydride or maleic anhydride, and combinations thereof. Monomer A1 is more preferably selected from the group consisting of acrylic acid, methacrylic acid, itaconic acid, fumaric acid and mixtures thereof. Most preferred monomers A1 are methacrylic acid and/or acrylic acid.

The monomers A2 are ethylenically unsaturated monomers which are different from monomers A1 and are amenable for copolymerization with monomers A1. Useful monomers A2 include acrylates, methacrylates, arylalkylenes, dienes, vinyl esters, nitriles, olefinically unsaturated halides and any mixture thereof. Examples of suitable dienes are 1,3-butadiene and isoprene. An example of a suitable vinyl ester is vinyl acetate. Suitable arylalkylenes comprise (optionally hydrocarbo substituted) styrene and conveniently the optional hydrocarbo may be $C_{1-10}$ hydrocarbyl, more conveniently $C_{1-4}$ alkyl. Suitable arylalkylene monomers may be selected from: styrene, α-methyl styrene, vinyl toluene, t-butyl styrene, di-methyl styrene and/or mixtures thereof, especially styrene and/or α-methyl styrene. Suitable nitriles are acrylonitrile and methacrylonitrile. Suitable ethylenically unsaturated halides are vinyl chloride, vinylidene chloride and vinyl fluoride. The aforementioned monomers form generally at least 80 wt. %, preferably at least 90 wt. %, more preferably at least 92 wt. %, more preferably at least 94 wt. % and most preferably 100 wt. % of the total amount of monomers A2, and thus constitute the main monomers A2. Preferably, the main monomers A2 are selected from the group consisting of acrylates, methacrylates, arylalkylenes and any mixture thereof. Preferably the acrylate or methacrylate comprises hydrocarbo (meth)acrylate(s) and conveniently the hydrocarbo moiety may be $C_{1-20}$ hydrocarbyl, more conveniently $C_{12}$ alkyl, most conveniently $C_{1-10}$ alkyl, for example $C_{1-8}$ alkyl. Suitable (meth) acrylate(s) may be selected from: methyl (meth)acrylate, ethyl (meth)acrylate, 4-methyl-2-pentyl (meth)acrylate, 2-methylbutyl (meth)acrylate, isoamyl (meth)acrylate, sec-butyl (meth)acrylate, n-butyl (meth)acrylate, 2-ethylhexyl (meth)acrylate, 2-octyl (meth)acrylate, lauryl (meth)acrylate, isodecyl (meth)acrylate, cyclohexyl (meth)acrylate, isobornyl (meth)acrylate and/or mixtures thereof. More preferably, the main monomers A2 are selected from the group consisting of methyl acrylate, methyl methacrylate, ethyl acrylate, ethyl methacrylate, n-butyl methacrylate, n-butyl acrylate, 2-ethylhexyl acrylate, 2-ethylhexyl methacrylate, styrene, α-methyl styrene and any mixture thereof. Even more preferably, the main monomers A2 are styrene, α-methyl styrene, methyl methacrylate, n-butyl acrylate and/or 2-ethylhexyl acrylate. Even more preferably, the main monomers A2 are styrene and/or α-methyl styrene.

Optionally monomers A2 are used which are ethylenically unsaturated monomers having functional groups for imparting crosslinkability when the aqueous coating formulation comprising the aqueous polymer dispersion is subsequently dried. The functional groups for providing crosslinkability are preferably selected from silane, epoxy, hydroxyl, ketone and aldehyde groups. Monomers A2 with functional groups for imparting crosslinkability is (are) preferably selected from glycidyl (meth)acrylate, hydroxyalkyl (meth)acrylates such as hydroxyethyl (meth)acrylate and methyl vinyl ketone, the acetoacetoxy esters of hydroxyalkyl (meth) acrylates such as acetoacetoxyethyl (meth)acrylate, and keto-containing amides such as diacetone acrylamide. The functional group for providing crosslinkability is most preferably a ketone group. In case monomers A2 with functional groups for imparting crosslinkability are applied in the present invention, the aqueous polymer dispersion is preferably combined with a crosslinking agent (i.e. so that crosslinking takes place e.g. after the formation of a coating therefrom). For example, comonomer(s) with hydroxyl functional groups for imparting crosslinkability are used in combination with for example a polyisocyanate or melamine resin as crosslinking agent, resulting in two-component acrylic coating systems which are however not preferred. Comonomer(s) with functional groups for imparting crosslinkability comprising ketone and/or aldehyde functional groups are used in combination with for example a polyamine or a polyhydrazide as crosslinking agent. An example of a suitable polyamine is isophorone diamine or a polyalkylene imine such as polyethylene imine, for example obtainable from BASF under the trade name Lupasol®. Examples of suitable polyhydrazides are carbodihydrazide, adipic acid dihydrazide, oxalic acid dihydrazide, phthalic acid dihydrazide and terephthalic acid dihydrazide. A preferred polyhydrazide is carbodihydrazide or adipic acid dihydrazide. A preferred combination of crosslinking agent and functional group for imparting crosslinkability when the aqueous coating formulation is subsequently dried is the combination of adipic acid dihydrazide or carbodihydrazide as crosslinking agent and at least one ketone group present in the monomer A2 with functional groups for imparting crosslinkability. Diacetone acrylamide (DAAM) is a preferred monomer A2 with ketone functional groups for use in combination with carbodihydrazide or adipic acid dihydrazide. The monomers A2 with functional groups for imparting crosslinkability are used generally in amounts ≤10 wt. %, preferably ≤8 wt. %, more preferably ≤6 wt. %, of the total amount of monomers A2. However, in one embodiment of the present invention advantageously the vinyl polymer A are substantially free of, more advantageously have no ethylenically unsaturated monomers comprising crosslinkable groups. It should be noted that monomer A1, in particular (meth)acrylic acid, may also act as crosslinkable monomer. (Meth)acrylic acid for example is usually used as a water-dispersible monomer, however, it may also act as a crosslinkable monomer. In the context of the invention, such monomers are considered A1 monomers.

Monomers A2 are preferably selected from the group consisting of methyl acrylate, methyl methacrylate, ethyl acrylate, ethyl methacrylate, n-butyl methacrylate, n-butyl acrylate, 2-ethylhexyl acrylate, 2-ethylhexyl methacrylate, styrene, α-methyl styrene and any mixture thereof. Even more preferably, the monomers A2 are styrene, α-methyl styrene, methyl methacrylate, n-butyl acrylate and/or 2-ethylhexyl acrylate. Most preferably, the main monomers A2 are styrene and/or α-methyl styrene.

The at least one vinyl polymer A comprises:
from 5 to 25 wt. % of at least one carboxylic acid functional ethylenically unsaturated monomer A1, and
from 75 to 95 wt. % of at least one ethylenically unsaturated monomer A2 different than monomer A1,
where the amounts are given relative to the total weight of monomers charged in the polymerization to prepare the vinyl polymer A. Preferably, the amounts of monomers A1 and A2 add up to 100 wt. %, i.e. the monomers charged in the polymerization to prepare the vinyl polymer A preferably consist of monomers A1 and A2.

Preferably, the at least one vinyl polymer A comprises:
from 10 to 22.5 wt. % of at least one carboxylic acid functional ethylenically unsaturated monomer A1, and
from 77.5 to 90 wt. % of at least one ethylenically unsaturated monomer A2 different than monomer A1,
where the amounts are given relative to the total weight of monomers charged in the polymerization to prepare the vinyl polymer A. Preferably, the amounts of monomers A1 and A2 add up to 100 wt. %, i.e. the monomers charged in the polymerization to prepare the vinyl polymer A preferably consist of monomers A1 and A2.

More preferably, the at least one vinyl polymer A comprises:
from 12.5 to 22.5 wt. % of at least one carboxylic acid functional ethylenically unsaturated monomer A1, and
from 77.5 to 87.5 wt. % of at least one ethylenically unsaturated monomer A2 different than monomer A1,
where the amounts are given relative to the total weight of monomers charged in the polymerization to prepare the vinyl polymer A. Preferably, the amounts of monomers A1 and A2 add up to 100 wt. %, i.e. the monomers charged in the polymerization to prepare the vinyl polymer A preferably consist of monomers A1 and A2.

The at least one polymer A has a weight average molecular weight of from 1000 to 70000 g/mol, preferably from 5000 to 60000 g/mol, more preferably from 7000 to 50000 and most preferably from 10000 to 40000 g/mol. The molecular weight distribution is determined with SEC and measured with three PLgel 10 μm Mixed-B columns at 70° C. on a Waters Alliance 2695 LC system with a Waters 2410 DRI detector and a Waters 2996 PDA detector. N-Methylpyrrolidone (NMP) with 20% v/v Methylethylketone (MEK) and 10 mmol lithium bromide (LiBr) is used as eluent with a flow of 1 mL/min. The samples are dissolved in the eluent using a concentration of 5 mg polymer per mL solvent. The solubility is judged with a laser pen after 24 hours stabilization at room temperature; if any scattering is visible the samples are filtered first and 150 μl sample solution is injected(0.45 micron PTFE filter). The MMD (molecular mass distribution), the number and weight average molecular weight results are calculated with narrow polystyrene standards from 474 to 1.730.000 Da. As used herein, the weight average molecular weight of polymer A, polymer B1 and polymer B2 are determined with SEC as described above.

The monomers A1 and A2 are preferably chosen such that the glass transition temperature of the at least one vinyl polymer A is from 60 to 140° C., more preferably from 70 to 130° C. In the event that more than one vinyl polymer A is present in the aqueous dispersion, a weight-averaged glass transition temperature is used. As used herein, the glass transition temperature is determined by calculation by means of the Fox equation. Thus, the $T_g$ in Kelvin, of a copolymer having "n" copolymerized comonomers is given by the weight fractions W of each comonomer type and the $T_g$'s of the homopolymers (in Kelvin) derived from each comonomer according to the equation:

$$T_g = 1/(\Sigma(W_n/Tg_n))$$

The glass transition temperatures of homopolymers may be found, for example, in "Polymer Handbook", edited by J. Brandrup and E. H. Immergut.

The monomers A1 and A2 are preferably chosen such that the calculated Hansch parameter of polymer A is higher than 1.35, more preferably at least 1.40 and even more preferably at least 1.50. Preferably, the calculated Hansch parameter of polymer A is at most 2.20.

In the event that more than one vinyl polymer A is present in the aqueous dispersion, a weight-averaged Hansch parameter is used. The Hansch parameter for a polymer is calculated using a group contribution method. The monomer units forming a polymer are assigned a hydrophobicity contribution and the hydrophobicity of the polymer, the Hansch parameter, is calculated based on the weight average of the monomers present in the monomer mixture to produce the polymer as disclosed in Hansch and Fujita, J. Amer. Chem. Soc., 86, 1616-1626 (1964); H. Kubinyi, Methods and Principles of Medicinal Chemistry, Volume 1, R. Mannhold et al., Eds., VCH, Weinheim (1993); C. Hansch and A. Leo, Substituent Constants for Correlation Analysis in Chemistry and Biology, Wiley, New York (1979); and C. Hansch, P. Maloney, T. Fujita, and R. Muir, Nature, 194. 178-180 (1962). High pH Hansch parameters are used. In the context of the present invention, the Hansch parameters for the monomers are generally calculated with the "KOWWIN v1.68" (September 2010) software which is made available to the public by the US Environmental Protection Agency (EPA) as "Estimation Programs Interface Suite™ for Microsoft® Windows, v4.11" [2012], United States Environmental Protection Agency, Washington, D.C., USA. This program ascertained the Hansch parameters for the monomers A1 and A2 and monomers B1 and B2 that were among those used in this document. Since the polymers A used or the aqueous polymer dispersions obtained by the process advantageously have a pH in the neutral to slightly alkaline range, complete deprotonation was assumed for the monomers containing acid groups, and so the calculation was made with the salt specified in each case.

| Monomer | Calculated individual Hansch parameter |
| --- | --- |
| Maleic acid (as disodium maleate) | −5.21 |
| Itaconic acid (as disodium itaconate) | −5.60 |
| Vinylsulfonic acid (as sodium vinylsulfonate) | −4.17 |
| Acrylic acid (as ammonium acrylate) | −2.43 |
| Methacrylic acid (as ammonium methacrylate) | −1.89 |
| Hydroxyethyl acrylate | −0.25 |
| Hydroxyethyl methacrylate | 0.30 |
| Vinyl acetate | 0.73 |
| Ethyl acrylate | 1.22 |
| Methyl acrylate | 0.73 |
| Ureidomethacrylate | 0.41 |
| Acetoacetoxyethyl methacrylate | 0.24 |
| Styrene | 2.89 |
| α-Methylstyrene | 3.44 |
| Methyl methacrylate | 1.28 |
| n-Butyl acrylate | 2.20 |
| Isobutyl acrylate | 2.13 |
| Isobutyl methacrylate | 2.67 |
| Hexanediol diacrylate | 3.08 |
| 2-Ethylhexyl acrylate | 4.09 |
| 2-Ethylhexyl methacrylate | 4.64 |
| Butyl methacrylate | 2.75 |
| Isobornyl methacrylate | 4.76 |
| Lauryl acrylate | 6.13 |
| Lauryl methacrylate | 6.68 |
| Stearyl acrylate | 9.62 |
| Tetraethylene glycol diacrylate | 0.29 |
| Acrylonitrile | 0.21 |
| Allyl methacrylate | 2.12 |
| Butanediol diacrylate | 2.10 |
| Vinyltrimethoxysilane | −0.31 |
| Vinyltriethoxysilane | 1.16 |
| 3-Methacryloyloxypropyltrimethoxysilane | 0.75 |

The at least one vinyl polymer A is prepared by a conventional free-radically initiated polymerization in bulk or solution known to those skilled in the art. The bulk polymerization is preferably a semi-continuous or a continuous process using, for example, a plug flow reactor, or a hot tube reactor. Bulk polymerization of vinyl monomers is described in detail in EP156170, WO82/02387, and U.S. Pat. No. 4,414,370. In general in a bulk polymerization process a mixture of two or more vinyl monomers are charged continuously into a reactor zone containing molten vinyl oligomer having the same ratio of vinyl monomers as the vinyl monomer mixture. The polymer A prepared via bulk polymerization is preferably made water-dispersible by partial or full neutralization of the carboxylic acid groups. Suitable neutralising agents are bases, examples of which include organic bases such as alkyl amines (e.g. triethyl amine, tributyl amine), morpholine and alkanol amines, and inorganic bases, examples of which include ammonia, NaOH, KOH and LiOH. Preferably the base is selected from the group consisting of ammonia, dimethyl ethanol amine or a mixture thereof.

In the case that the polymer A is prepared using solution polymerization, the polymer A is dissolved in a suitable solvent. Suitable solvents are coalescents as described herein below and/or solvents with a boiling point at atmospheric pressure lower than 150° C. Preferred solvents are those having a boiling point at atmospheric pressure of not more than 130° C., more preferred not more than 100° C., and most preferred not more than 90° C. Preferred solvents are acetone, methylethyl ketone, ethanol, i-propanol, ethyl acetate, butyl acetate and/or toluene. Other suitable solvents will be well known to those skilled in the art. Most preferred solvents are acetone and/or methylethyl ketone. In those cases where the polymerization temperature exceeds that of the boiling points of solvent and/or monomer, the polymerization will be performed under increased pressure. The polymer A prepared via solution polymerization can be dissolved or dispersed in water using a base and next be used as is. It is, however, preferred when the solvent used in the polymerization step is removed after the polymer A is dispersed in water using a base. Removal of the solvent can be done by increasing temperature or reducing pressure. It is preferred to combine these. Solvent can be removed after dispersing the polymer A prior to further use. It can, however, be envisaged that solvent can also be removed after the polymer A is used in the subsequent steps that are elaborated below.

To prepare vinyl polymer A a conventional free-radical-yielding initiator may be used. Suitable free-radical-yielding initiators include inorganic peroxides such as percarbonates; organic peroxides, such as acyl peroxides including e.g. benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. Azo functional initiators may also be used. Preferred azo initiators include 2,2'-azodi(2-methylbutyronitrile) and 4,4'-azobis(4-cyanovaleric acid). The amount of initiator or initiator system used is conventional, e.g. within the range 0.05 to 6 wt percent based on the total vinyl monomers used to prepare vinyl polymer A. Preferred initiators include 2,2'-azodi(2-methylbutyronitrile), 4,4'-azobis(4-cyanovaleric acid), peroxy esters and mixtures thereof. The molecular weight of the vinyl polymer A can be regulated by initiator concentration and temperature.

Vinyl polymer A contains sufficient water-dispersing groups to render the vinyl polymer A dispersible or partially soluble in an aqueous medium (i.e. at least part of the potentially ionic carboxylic groups of polymer A are deprotonated to obtain ionic water-dispersing groups by neutralisation of at least a part of the carboxylic acid functional groups of polymer A). As used herein, a potentially ionic water-dispersing group means a group which under the relevant conditions can be converted into an ionic group by salt formation. Suitable neutralising agents are bases, examples of which include organic bases such as alkyl amines (e.g. triethyl amine, tributyl amine), morpholine and alkanol amines, and inorganic bases, examples of which include ammonia, NaOH, KOH and LiOH. Preferably the base is selected from the group consisting of ammonia, dimethyl ethanol amine or a mixture thereof. Preferably the neutralization (the deprotonating) is effected following the bulk or solution polymerization process to prepare vinyl polymer A and before, during, or before and during the free-radically initiated aqueous emulsion polymerization to prepare polymer B. More preferably, the neutralization is effected before performing the free-radically initiated aqueous emulsion polymerization to prepare polymer B. Accordingly, the process of the invention preferably further comprises deprotonating at least part of the carboxylic acid groups to obtain polymer A.

Preferably, the process further comprises, prior to the free-radically initiated emulsion polymerization of polymer B, dispersing the at least one polymer A in water. The neutralising (deprotonating) and dispersing of polymer A can be done in sequence, for example by first adding the base to the bulk or solution polymer and then adding water or by first adding the base to the bulk or solution polymer and then adding this composition to water. The neutralising (deprotonating) and dispersing of polymer A can also be done simultaneously by adding base and water simultaneously to the bulk or solution polymer or by adding the bulk or solution polymer to a solution of base in water.

Preferably, the process of the present invention comprises
A) preparing at least one vinyl polymer A by a process comprising:
free-radically initiated bulk or solution polymerization of:
from 5 to 25 wt. % of at least one carboxylic acid functional ethylenically unsaturated monomer A1, and
from 75 to 95 wt. % of at least one ethylenically unsaturated monomer A2 different than monomer A1,
where the amounts are given relative to the total weight of monomers charged in the polymerization to prepare the vinyl polymer A and the amounts of monomers A1 and A2 preferably add up to 100 wt. %, and
B) deprotonating at least part of the carboxylic acid groups and dispersing polymer A in an aqueous medium to obtain an aqueous dispersion of the at least one polymer A, and
C) free-radically initiated emulsion polymerization in the presence of the aqueous dispersion of the at least one polymer A, to form a polymer B comprising a vinyl polymer phase B1 with a glass transition temperature of from −20 to +15° C. and a vinyl polymer phase B2 with a glass transition temperature of from +50 to +110° C., with the proviso that the difference in glass transition temperature between polymer B1 and polymer B2 is at least 40° C.,
wherein the weight ratio of polymer B1 to polymer B2 is from 80:10 to 10:20,
wherein the glass transition temperature of the at least one vinyl polymer A is from 40 to 150° C.,
wherein the weight average molecular weight of the at least one polymer A is from 1000 to 70000 g/mol,
wherein the weight average molecular weight of the polymer A is lower than the weight average molecular weight of the polymer B, and
wherein the weight ratio of polymer A to polymer B is from 10:90 to 40:60.

Polymer B

Polymer B comprises two polymer phases, i.e. a soft vinyl polymer phase B1 with a glass transition temperature of from −20 to +15° C. and a hard vinyl polymer phase B2 with a glass transition temperature of from +50 to +110° C.

The weight ratio of polymer B1 to polymer B2 is from 80:10 to 10:20, preferably from 70:10 to 10:20, more preferably from 60:10 to 10:20, more preferably 50:10 to 10:18 and most preferably from 40:10 to 10:15.

The weight average molecular weight of polymer B is higher than the weight average molecular weight of polymer A. The weight average molecular weight of polymer B2 may optionally be lower than the weight average molecular weight of polymer A. The weight average molecular weight of polymer B is preferably at least 100000 g/mol, whereby the weight average molecular weight of polymer B2 may optionally be lower than 100000 g/mol. Preferably, the weight average molecular weight of both polymer phases B1 and B2 in polymer B is not regulated.

Most preferably, the weight average molecular weight of polymer B1 is at least 100000 g/mol and the weight average molecular weight of polymer B2 is at least 100000 g/mol.

The polymer phases B1 and B2 are prepared by a conventional free-radically initiated aqueous emulsion polymerization in the presence of polymer A.

Preferably, the polymer phase B1 is prepared by a free-radically initiated aqueous emulsion polymerization in the presence of polymer A of:
from 0 to 5 wt. % of at least one carboxylic acid functional ethylenically unsaturated monomer B1.1, and
from 95 to 100 wt. % of at least one ethylenically unsaturated monomer B1.2 different than monomer B1.1, where the amounts are given relative to the total weight of monomers charged in the polymerization to prepare the vinyl polymer B1 and where the amounts of monomers B1.1 and B1.2 preferably add up to 100 wt. %, i.e. the monomers charged in the polymerization to prepare the polymer phase B1 preferably consist of monomers B1.1 and B1.2. More preferably, the amount of monomers B1.1 in the preparation of polymer B1 is at most 3 wt. %, even more preferably at most 2 wt. % and especially preferably 0 wt. %, and the amount of monomers B1.2 is accordingly more preferably at least 97 wt. %, even more preferably at least 98 wt. % and especially preferably 100 wt. %.

Preferably, the polymer phase B2 is prepared by a free-radically initiated aqueous emulsion polymerization in the presence of polymer A of:
from 0 to 5 wt. % of at least one carboxylic acid functional ethylenically unsaturated monomer B2.1, and
from 95 to 100 wt. % of at least one ethylenically unsaturated monomer B2.2 different than monomer B2.1, where the amounts are given relative to the total weight of monomers charged in the polymerization to prepare the vinyl polymer B2 and where the amounts of monomers B2.1 and B2.2 preferably add up to 100 wt. %, i.e. the monomers charged in the polymerization to prepare the polymer phase B2 preferably consist of monomers B2.1 and B2.2. More preferably, the amount of monomers B2.1 in the preparation of polymer B2 is at most 3 wt. %, even more preferably at most 2 wt. % and especially preferably 0 wt. %, and the amount of monomers B2.2 is accordingly more preferably at least 97 wt. %, even more preferably at least 98 wt. % and especially preferably 100 wt. %.

Suitable monomers B1.1 and suitable monomers B2.1 correspond to the monomers A1 as described above, and suitable monomers B1.2 and suitable monomers B2.2 correspond to the monomers A2 as described above, except that the nature and amount of these monomers are chosen such that the polymer B1 obtained from the monomers B1.1 and B1.2 has a glass transition temperature of from −20 to +15° C. and the polymer B2 obtained from the monomers B2.1 and B2.2 has a glass transition temperature of from +50 to +110° C., with the proviso that the difference in glass transition temperature between polymer B1 and polymer B2 is at least 40° C.

The glass transition temperature of the vinyl polymer phase B1 is from −20 to +15° C.

The glass transition temperature of the vinyl polymer phase B2 is from +50 to +110° C., preferably from +55 to +105° C. and more preferably from +60 to +105° C.

The difference in glass transition temperature between polymer B1 and polymer B2 is at least 40° C., preferably at least 45° C., more preferably at least 50° C., even more preferably at least 55° C., even more preferably at least 60° C., even more preferably at least 65° C., even more preferably at least 70° C., even more preferably at least 75° C. Thus the $T_g$ of polymer B2 is at least 40° C., preferably at least 45° C., more preferably at least 50° C., even more preferably at least 55° C., even more preferably at least 60° C., even more preferably at least 65° C., even more preferably at least 70° C., even more preferably at least 75° C. higher than the $T_g$ of polymer B1.

The monomers B1.2 and the monomers B2.2 are ethylenically unsaturated monomers which are different from monomers B1.1 and monomers B2.1 and are amenable for copolymerization with monomers B1.1 and monomers B2.1. Useful monomers B1.2 and useful monomers B2.2 include acrylates, methacrylates, arylalkylenes, dienes, vinyl esters, nitriles, olefinically unsaturated halides and any mixture thereof. Examples of suitable dienes are 1,3-butadiene and isoprene. An example of a suitable vinyl ester is vinyl acetate. Suitable arylalkylenes comprise (optionally hydrocarbo substituted) styrene and conveniently the optional hydrocarbo may be $C_{1-10}$ hydrocarbyl, more conveniently $C_{1-4}$ alkyl. Suitable arylalkylene monomers may be selected from: styrene, α-methyl styrene, vinyl toluene, t-butyl styrene, di-methyl styrene and/or mixtures thereof, especially styrene and/or α-methyl styrene. Suitable nitriles are acrylonitrile and methacrylonitrile. Suitable ethylenically unsaturated halides are vinyl chloride, vinylidene chloride and vinyl fluoride. The aforementioned monomers form generally at least 80 wt. %, preferably at least 90 wt. %, more preferably at least 92 wt. %, more preferably at least 94 wt. % and most preferably 100 wt. % of the total amount of monomers B1.2 and B2.2, and thus constitute the main monomers B1.2 and B2.2. Preferably, the main monomers B1.2 and B2.2 are independently selected from the group consisting of acrylates, methacrylates, arylalkylenes and any mixture thereof. Preferably the acrylate or methacrylate comprises hydrocarbo (meth)acrylate(s) and conveniently the hydrocarbo moiety may be $C_1$-20hydrocarbyl, more conveniently $C_{1-12}$alkyl, most conveniently $C_{1-10}$alkyl, for example $C_{1-8}$alkyl. Suitable (meth)acrylate(s) may be selected from: methyl (meth)acrylate, ethyl (meth)acrylate, 4-methyl-2-pentyl (meth)acrylate, 2-methylbutyl (meth)acrylate, isoamyl (meth)acrylate, sec-butyl (meth)acrylate, n-butyl (meth)acrylate, tert-butyl (meth)acrylate, 2-ethylhexyl (meth)acrylate, 2-octyl (meth)acrylate, lauryl (meth)acrylate, isodecyl (meth)acrylate, cyclohexyl (meth)acrylate and/or mixtures thereof. More preferably, the main monomers B1.2 and B2.2 are independently selected from the group consisting of methyl acrylate, methyl methacrylate, ethyl acrylate, ethyl methacrylate, n-butyl methacrylate, n-butyl acrylate, 2-ethylhexyl acrylate, 2-ethylhexyl methacrylate, styrene, α-methyl styrene and any mixture thereof. Even more preferably, the main monomers B1.2 and B2.2 are independently styrene, methyl methacrylate, n-butyl acrylate, 2-ethylhexyl acrylate or any mixture thereof. Even more preferably, the main monomers B1.2 and B2.2 are independently styrene and/or 2-ethylhexyl acrylate.

Optionally monomers B1.2 and/or B2.2 are used which are ethylenically unsaturated monomers having functional groups for imparting crosslinkability when the aqueous coating formulation comprising the aqueous polymer dispersion is subsequently dried. The functional groups for providing crosslinkability are preferably selected from silane, epoxy, hydroxyl, ketone and aldehyde groups. Monomers B1.2 and B2.2 with functional groups for imparting crosslinkability is (are) preferably selected from glycidyl (meth)acrylate, hydroxyalkyl (meth)acrylates such as hydroxyethyl (meth)acrylate and methyl vinyl ketone, the acetoacetoxy esters of hydroxyalkyl (meth)acrylates such as acetoacetoxyethyl (meth)acrylate, and keto-containing amides such as diacetone acrylamide. The functional group for providing crosslinkability is most preferably a ketone group. In case monomers B1.2 and/or B2.2 with functional groups for imparting crosslinkability are applied in the present invention, the aqueous polymer dispersion is preferably combined with a crosslinking agent (i.e. so that crosslinking takes place e.g. after the formation of a coating therefrom). For example, comonomer(s) with hydroxyl functional groups for imparting crosslinkability are used in combination with for example a polyisocyanate as crosslinking agent, resulting in two-component acrylic coating systems which are however not preferred. Comonomer(s) with functional groups for imparting crosslinkability comprising ketone and/or aldehyde functional groups are used in combination with for example a polyamine or a polyhydrazide as crosslinking agent. An example of a suitable polyamine is isophorone diamine or a polyalkylene imine such as polyethylene imine, for example obtainable from BASF under the trade name Lupasol®. Examples of suitable polyhydrazides are carbodihydrazide, adipic acid dihydrazide, oxalic acid dihydrazide, phthalic acid dihydrazide and terephthalic acid dihydrazide. A preferred polyhydrazide is carbodihydrazide or adipic acid dihydrazide. A preferred combination of crosslinking agent and functional group for imparting crosslinkability when the aqueous coating formulation is subsequently dried is the combination of carbodihydrazide or adipic acid dihydrazide as crosslinking agent and at least one ketone group present in the monomer B1.2 and/or B2.2 with functional groups for imparting crosslinkability. Diacetone acrylamide (DAAM) is a preferred monomer B1.2 and/or preferred monomer B2.2 with ketone functional groups for use in combination with carbodihydrazide or adipic acid dihydrazide. The monomers B1.2 with functional groups for imparting crosslinkability respectively monomers B2.2 with functional groups for imparting crosslinkability are used generally in amounts ≤10 wt. %, preferably ≤8 wt. %, more preferably ≤6 wt. %, even more preferably ≤4 wt. %, even more preferably ≤2 wt. %, of the total weight of monomers charged in the preparation of polymer B1 respectively of polymer B2. However, in one embodiment of the present invention advantageously the polymers B1 and B2 are substantially free of, more advantageously have no ethylenically unsaturated monomers comprising crosslinkable groups.

Optionally ethylenically unsaturated monomers containing at least two nonconjugated ethylenically unsaturated double bonds are used as monomers B1.2 and/or B2.2. Examples of these are monomers having two vinyl moieties, monomers having two vinylidene moieties, and also monomers having two alkenyl moieties. Particularly advantageous monomers here are the diesters of dihydric alcohols with alpha, beta-monoethylenically unsaturated monocarboxylic acids, and among these preference is given to acrylic and methacrylic acid. Examples of monomers of this type having two non-conjugated ethylenically unsaturated double bonds are alkylene glycol diacrylates and alkylene glycol dimethacrylates, for example ethylene glycol diacrylate, propylene 1,2-glycol diacrylate, propylene 1,3-glycol diacrylate, butylene 1,3-glycol diacrylate, butylene 1,4-glycol diacrylate, hexane-1,6-diol diacrylate and ethylene glycol dimethacrylate, propylene 1,2-glycol dimethacrylate, propylene 1,3-glycol dimethacrylate, butylene glycol 1,3-dimethacrylate, butylene glycol 1,4-dimethacrylate, hexane-1,6-diol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, and triallyl isocyanurate. Ethylenically unsaturated monomers containing nonconjugated ethylenically unsaturated double bonds with different reactivity are often referred to as graftlinker monomers. A preferred graftlinker monomer is allyl methacrylate. The aforementioned monomers B2.1 and/or B2.2 are used generally in amounts ≤5 wt. %, preferably ≤2 wt. %, more preferably 0 wt. % of the total weight of monomers charged in the preparation of polymer B1 respectively of polymer B2.

The monomers B1.2 and/or monomers B2.2 are preferably independently selected from the group consisting of methyl acrylate, methyl methacrylate, ethyl acrylate, ethyl methacrylate, n-butyl methacrylate, n-butyl acrylate, tert.-butyl methacrylate, tert.-butyl acrylate 2-ethylhexyl acrylate, 2-ethylhexyl methacrylate, styrene, α-methyl styrene and any mixture thereof. Even more preferably, the monomers B1.2 and B2.2 are independently are styrene, methyl methacrylate, n-butyl acrylate and/or 2-ethylhexyl acrylate. Even more preferably, the monomers B1.2 and B2.2 are independently styrene and/or 2-ethylhexyl acrylate.

There is no preference in polymerizing the polymer phase B1 first, followed by the polymer phase B2, or vice versa. In case the polymer phase B1 is polymerized first, the polymer phase B2 is prepared in the presence of polymer A and polymer B1. In case the polymer phase B2 is polymerized first, the polymer phase B1 is prepared in the presence of polymer A and polymer B2.

Preferably, Polymer B consists of the two polymer phases B1 and B2.

The monomers to prepare the vinyl polymer B1 are preferably chosen such that the calculated Hansch parameter is higher than 1.20, more preferably at least 1.40, even more preferably at least 1.60, even more preferably at least 1.80, even more preferably at least 2.0, even more preferably at least 2.20, even more preferably at least 2.40, even more preferably at least 2.60 and even more preferably at least 2.80, and advantageously at most 4.00, more advantageously at most 3.80, more advantageously at most 3.70 and even more advantageously at most 3.60.

The monomers to prepare the vinyl polymer B2 are preferably chosen such that the calculated Hansch parameter is higher than 1.20, more preferably at least 1.40, even more preferably at least 1.60, even more preferably at least 1.80, even more preferably at least 2.0, even more preferably at least 2.20, even more preferably at least 2.40, even more preferably at least 2.60 and even more preferably at least 2.80, and advantageously at most 4.00, more advantageously at most 3.80, more advantageously at most 3.70, even more advantageously at most 3.60, even more advantageously at most 3.50.

Methods for preparing vinyl polymers by free-radically initiated emulsion polymerization in an aqueous medium are known in the art and are described in for example Handbook Emulsion Polymerization: Theory and Practice, 1975, by D. C. Blackley (ISBN 978-0-85334-627-2). The preparation of vinyl polymers by means of multistage emulsion polymerization is also familiar to the skilled person, see further for example WO95/29963 and EP710680.

In the present invention, the preparation of polymer B is a sequential free-radically initiated emulsion polymerization process in the presence of free-radical-yielding initiator and optionally chain transfer agent. The sequential free-radically initiated emulsion polymerization process to prepare polymer B comprises at least two polymerization stages. The emulsion polymerization to obtain polymer B is a free-radically initiated emulsion polymerization that is conducted using appropriate heating and agitation (stirring). The free-radically initiated emulsion polymerization is usually effected at atmospheric pressure and a temperature in the range from 30 to 100° C., preferably from 50 to 100° C., more preferably from 60 to 100° C., even more preferably from 60 to 90° C. Suitable free-radical-yielding initiators include persulphates such as ammonium, K and Na salts of persulphate, or redox initiator systems; combinations such as t-butyl hydroperoxide or hydrogen peroxide or cumene hydroperoxide, with isoascorbic acid or sodium formaldehydesulphoxylate, and optionally FeEDTA are useful. The amount of initiator, or initiator system, is generally 0.05 to 3 wt. % based on the weight of total monomers charged to prepare polymer B.

Surfactants can be utilised in order to further (further since in the present invention advantageously vinyl polymer A is self-dispersible in water) assist in the dispersion of the vinyl polymer A and/or vinyl polymer B in water. If surfactant is used, it is preferably used in the free-radically initiated aqueous emulsion polymerization to prepare polymer B. Suitable surfactants include conventional anionic and/or non-ionic surfactants and mixtures thereof such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids; fatty alcohols, ethoxylated fatty acids and/or fatty amides, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Non-ionic surfactants include polyglycol ether compounds and preferably polyethylene oxide compounds as disclosed in "Non-Ionic Surfactants—Physical Chemistry" edited by M. J. Schick, M. Decker 1987. Preferred surfactants are anionic surfactants. If surfactant is used, the amount of surfactant used is preferably 0.03 to 3% by weight based on the weight of vinyl polymer A and vinyl polymer B.

The weight ratio of polymer A to polymer B is from 10:90 to 40:60, preferably from 15:85 to 35:65 and most preferably from 15:85 to 30:70.

There is further provided according to the invention an aqueous coating formulation comprising the aqueous polymer dispersion as described herein above, whereby the polymers present in the aqueous polymer dispersion are used as binders.

It has surprisingly been found that with the aqueous coating formulations of the invention a coating can be obtained with good chemical resistances in particular water, ethanol and coffee resistance and preferably also red wine, mustard and onion resistance in combination with good mechanical properties in particular anti-blocking, pencil hardness and König hardness while at the same time the amount of coalescent can be limited to less than 130 g of coalescent per litre aqueous coating formulation and also the drop in in particular the above mentioned chemical resistances in pigmented and/or matted coating formulations is minimal or at least acceptable. A coalescent is an organic solvent acting as a film-forming assistant. Coalescent is used to lower the minimum film-forming temperature of the polymer binders. Suitable examples include esters such as methylglycol acetate, ethylglycol acetate, methoxypropyl acetate, 2,2,4-trimethylpentane-1,3-diol monoisobutyrate (Texanol® from Eastman), dipropylene glycol monomethyl ether acetate, propylene glycol monoethyl ether acetate, propylene glycol monomethyl ether acetate, ethers such as butylglycol, ethylglycol ether, diethylene glycol monoethyl ether, diethylene glycol monomethyl ether, diethylene glycol mono-n-butyl ether, diethylene glycol mono-n-hexyl ether, diethylene glycol diethyl ether, diethylene glycol dimethyl ether, diethylene glycol di-n-butyl ether, diethylene glycol di-n-hexyl ether, ethylene glycol di-2-ethylhexyl ether, ethylene glycol di-n-butyl ether, ethylene glycol di-n-hexyl ether, ethylene glycol di-n-propyl ether, dipropylene glycol dimethyl ether, dipropylene glycol monomethyl ether, dipropylene glycol mono-n-butyl ether, dipropylene glycol mono-n-propyl ether, dipropylene glycol mono-tert-butyl ether, dipropylene glycol di-tert-butyl ether, propylene glycol monoethyl ether, propylene glycol monomethyl ether, propylene glycol mono-n-propyl ether, propylene glycol monophenyl ether, propylene glycol mono-tert-butyl ether, propylene glycol diphenyl ether, propylene glycol mono-n-butyl ether, tripropylene glycol monomethyl ether and poly (allyl glycidyl ether). A mixture of coalescents can also be used.

Preferably, the aqueous coating formulation preferably comprises less than 130 g of VOC per litre aqueous coating formulation. This VOC requirement is for example listed in the IKEA Specification IOS-MAT-0066 version AA-163938-9, dd 17-01-2014.

The aqueous coating formulations of the invention can advantageously be applied as one-component coating systems without the necessity of mixing reactive materials just prior to application as in a two-component coating system. The advantages of one-component coating systems compared to two-component coating systems are more facile storage, handling and application of the coating system. With the aqueous polymer dispersions of the present invention, one-component coating systems can be obtained with an advantageous combination of low VOC, good chemical resistances in particular water, ethanol and coffee resistance and preferably also red wine, mustard and onion resistance, and good mechanical properties in particular anti-blocking, pencil hardness and König hardness in clear glossy, clear satin, pigmented glossy and pigmented satin formulations.

The aqueous coating formulation according to the invention comprises the aqueous polymer dispersion according to the invention and may further comprise pigments, dyes, heat stabilisers, defoamers, fillers, matting agents, UV absorbers and/or antioxidants. Non-limiting examples of coating formulation are paints; overprint varnishes for example for paper or film; film coatings such as for example printable substrates, barrier coatings, primers, protective coatings; and inks for example for flexo printing, gravure printing and inkjet printing.

In case of a clear glossy aqueous coating formulation, the weight percentage of polymer A, polymer B1 and polymer B2 together is preferably at least 90 wt. %, more preferably at least 95 wt. %, of the solids content of the aqueous coating formulation.

In case of a clear satin aqueous coating formulation which comprises matting agent, the weight percentage of polymer A, polymer B1 and polymer B2 together is preferably at least 75 wt. %, more preferably at least 80 wt. %, of the solids content of the aqueous coating formulation.

In case of a pigmented glossy aqueous coating formulation which comprises pigment, the weight percentage of polymer A, polymer B1 and polymer B2 together is preferably at least 45 wt. %, more preferably at least 50 wt. %, of the solids content of the aqueous coating formulation.

In case of a pigmented satin aqueous coating formulation which comprises matting agent and pigment, the weight percentage of polymer A, polymer B1 and polymer B2 together is preferably at least 40 wt. %, more preferably at least 45 wt. %, of the solids content of the aqueous coating formulation.

The pigment(s) may be any pigment known in the art and is preferably an inorganic pigment. Examples of inorganic pigments include but are not limited to metallic oxides such as titanium dioxides, zinc oxides, iron oxides, cobalt oxides and chromium oxides; metal powder suspensions such as gold and aluminium; earth colours such as siennas, ochres and umbers; and lead chromates. The most preferred inorganic pigment is titanium dioxide (rutile). Organic pigments include mineral pigments such as carbon black.

The pigment volume concentration (PVC) as defined below of the aqueous coating composition of the invention is preferably in the range of from 1 to 60%, advantageously from 5 to 50% and especially advantageously from 10 to 40% and most especially 15 to 25%. The pigment volume concentration is defined as the solid pigment volume/(solid pigment volume+solid polymer A volume+solid polymer B volume).

The aqueous coating formulation may contain matting agents. Suitable are organic and inorganic matting agents for example those based on silicic acid.

There is further provided according to the invention a method of coating a substrate using an aqueous coating formulation as defined above. There is further provided according to the invention a substrate having a coating obtainable or derived from an aqueous polymer composition as defined above. There is further provided a coated furniture obtained by (1) applying the aqueous coating formulation according to the present invention onto a furniture, to form a coating thereon, and (2) drying the coating.

The present invention is now further illustrated but in no way limited by reference to the following examples. Unless otherwise specified all parts, percentages, and ratios are on a weight basis. The prefix C before an example number denotes that it is comparative.

EXAMPLES

Components and abbreviations used:
AA Acrylic acid
S styrene
2-EHA 2-ethylhexyl acrylate
HDDA 1,6-hexanediol diacrylate
LMCT Lauryl mercaptan
MFFT Minimum film formation temperature
BG butyl glycol
DPnB dipropylene glycol n-butyl ether
DPM dipropylene glycol methylether
RH relative humidity
VOC volatile organic compound content
EtOH ethanol
BYK-011 defoamer available from BYK
Libratex AS-10 anionic surfactant available from Libra Specialty Chemicals, UK
Tego Airex 902W a defoamer available from Evonik Industries
Rheovis PU1190 a low shear associative thickener available from BASF
Ceridust 9615 a micronized, blend of polyethylene and amide wax available from Clariant
Disperbyk 2015 dispersing additive available from BYK
Tioxide TR92 a multipurpose grade of rutile titanium dioxide available from Huntsman
Tego Foamex 810 a defoamer available from Evonik Industries
SR10PG a commercially available oligomer from Indulor AG with an acid value of 215-230 mg KOH/g solid, which corresponds to 27.9-29.8 wt % AA.

Synthesis of Polymer A

In a high pressure reactor methylethylketone (623.3 gram) was added. In a separate vessel a mixture of styrene (1052.4 gram), α-methylstyrene (167.8 gram), acrylic acid (305.0 gram) in methylethylketone (135.5 gram) was mixed with tert-butylperoxy benzoate (15.3 gram). The reactor content was heated to 128° C. The monomer feed was added to the reactor in 4 hours. After completion of the monomer feed the vessel was rinsed with methylethylketone (30.0 gram). 30 minutes after completion of the monomer feed tert-butylperoxy benzoate (5.9 gram) was added followed by a rinse with methylethylketone (30.0 gram). This step was repeated after another 30 minutes. After 3 more hours stirring at 128° C. the reactor was cooled and when the temperature was below 70° C. methylethylketone (300.0 gram) was added. The solids of the polymer solution is 57.1% and the weight average molecular weight is 27 kDa.

Preparation of a Dispersion of the Solution Polymer A (DPA)

In a reactor Polymer A (525.9 gram) was placed and heated to 40° C. Ammonia (25%, 18 gram) in demineralized water (72.0 gram) was added in 3 minutes and mixed for 5 minutes. Next, demineralized water (681.0 gram) was added in 7 minutes and the reactor content was mixed for 15 minutes. During this period BYK-011 (0.10 gram) was added. Next vacuum (from 1 bar to as low as 65 mbar) was applied to remove the methylethylketone. The final solids of the DPA was 32.0%, the pH was 7.3 and the particle size was 47 nm.

Example 1

A reactor was charged with DPA (462.9 gram), demineralized water (251.6 gram), Libratex AS-10 (10%, 22.6 gram). In a separate vessel a mixture of ammonium persulphate (0.6 gram) in demineralized water (41.9 gram) and Libratex AS-10 (5.6 gram) was prepared and the pH was adjusted to >8 with ammonia (25%). In another vessel a mixture of demineralized water (106.0 gram), Libratex AS-10 (11.3 gram), styrene (159.3 gram) and 2-ethylhexyl acrylate (141.3 gram) was prepared. The reactor content was heated to 80° C. At 80° C. a solution of ammonium persulphate (1.2 gram) in demineralized water (14.2 gram, pH adjusted to >8 with ammonia) was added. After 5 minutes the first monomer and initiator were fed in 60 minutes. The reactor was kept at 80° C. for 45 minutes. In the meanwhile a second monomer feed was prepared, i.e. a mixture of demineralized water (106.0 gram), Libratex AS-10 (3.8 gram) and styrene (300.6 gram), and a second initiator feed was prepared, i.e. a mixture of ammonium persulphate (1.8 gram) in demineralized water (97.8 gram), Libratex AS-10 (1.9 gram) and ammonia (25%) was prepared and the pH was adjusted to >8. Next, the second monomer feed and the second initiator feed were added in 60 minutes and the feed vessels were rinsed with demineralized water (13 gram in total). The reaction content was kept at 80° C. for another 30 minutes and then cooled to room temperature. A BIT solution (10%, 9.0 gram was added to preserve the polymer dispersion and the pH was adjusted to 7-8 with ammonia (25%).

Examples 2-7

Examples 2-7 were prepared according to a similar recipe and procedure as applied for Example 1, the amount of Polymer A, type and amounts of monomers for Polymers B1 and B2 are reported in Table 1.

Example 8

Example 1 was repeated, except that Polymer B2 was lowered in molecular weight with the use of lauryl mercaptan. The second monomer feed was a mixture of demineralized water (106.0 gram), Libratex AS-10 (3.8 gram), styrene (291.59 gram) and lauryl mercaptan (9.02 gram). The weight average molecular weight of polymer B2 was lower than the weight average molecular weight of polymer A.

Comparative Experiment C1

For Comparative Experiment C1 the following amounts were used for the reactor content. The reactor was charged with SR10PG (150.5 gram), demineralized water (524.5 gram), Libratex AS-10 (10%, 22.6 gram) and ammonia (39.6 gram, 25%). The reactor content was heated to 80° C. to dissolve the SR10PG. When all SR10PG was dissolved, the recipe and the process as described above for Example 1 was followed.

Comparative Experiments C2-C9

Comparative Experiments C2-C9 were prepared according to Example 1. The amount of Polymer A and type and amounts of monomers for Polymers B1 and B2 are reported in Table 1. For Comparative Experiment C2, the two monomer feeds of Example 1 were combined into one monomer feed that was added in 120 minutes and the two initiator feeds were combined into one feed and fed in 120 minutes. For Comparative Experiments C5 and C6, one monomer feed was used that was added in 120 minutes and the two initiator feeds were combined into one feed and fed in 120 minutes.

The specifications of the prepared polymers are given in Table 2.

Test Methods

The particle size was measured by a Malvern zetasizer nano S-90.

The solid content was measured by a Mettler Toledo HB43-S Halogen at 105° C.

The MFFT was measured by a Sheen MFFT 90.

The viscosity was measured by a Brookfield ametek DVE viscometer using spindle s62 at 60 RPM at 20° C.

The VOC content is calculated as $$\frac{\frac{1000 * \text{wt \% } VOC}{100}}{sg \text{ formulation}},$$

whereby sg is the theoretical calculated specific gravity of the aqueous coating formulation based on the specific gravity of all the raw materials present in the aqueous coating formulation and % VOC is the weight % VOC relative to the aqueous coating formulation. A volatile organic compound is an organic compound having an initial boiling point less than or equal to 250° C. measured at a standard atmospheric pressure of 101.3 kPa.

The chemical resistances were evaluated according to DIN 68861-1B and according to the IKEA Specification number IOS-MAT-0066, version number AA-163938-9, dd 17-01-2014. A 21*14.9 cm white melamine faced MDF panel is used. Prior to the test, the panel is sanded (P280) and cleaned with a cloth dampened with water and then dried with a clean and dry tea towel. 150 gram/m$^2$ was applied using a spray gun and the panels were allowed to dry for 24 hours in a climate chamber at 22° C. (+/−2° C.) and relatively humidity of 50%+/−5% followed by aging for 16 hours at 50° C. Stain evaluations are started when the panel is cooled down to room temperature. A liquid is applied on the coating by means of soaked filter paper and covered with a glass Petri dish. The filter paper is obtained from MACHEREY-NAGEL, MN 440 25 mm diameter. After a defined duration of influence on the surface, the paper is removed, the surface is patted dry, after 24 hours the surface is washed with paper soaked with cleansing agent and then the surface is investigated for damage. The cleansing agent has the following composition:

a) 12,5% (m/m) of a sodium primary $c_{10}$ to $c_{14}$ polymer alkyl aryl sulphonate,
b) 12,5% (m/m) polyethoxylated derivatives of primary or secondary $C_8$ to $C_{16}$ alcohols with 5 to 15 ethoxylated groups having a cloud point of 25° C. to 75° C. in 1% (m/m) aqueous solution (determination of cloud point is described in ISO 1065:1991),
c) 5,0% (m/m) ethanol,
d) 70% (m/m) distilled water.

The stain evaluation was done on an assessment scale of 1 to 5, whereby a rating of 5 is the best and a rating of 1 is the worst. The stains were scored according to the following ranks:

1=Strong change:
the structure of the surface being distinctly changed, and/or
discoloration or change in gloss and colour, and/or
the surface material being totally or partially removed, and/or
the filter paper remains adhering to the surface.
2=Significant change:
test area clearly distinguishable from adjacent surrounding area, visible in all viewing directions e.g. discoloration, change in gloss and colour, and/or
structure of the surface slightly changed, e.g. swelling, fibre raising, cracking, blistering.
3=Moderate change:
test area distinguishable from adjacent surrounding area, visible in several viewing directions, e.g. discoloration, change in gloss and colour;
no change in the surface structure e.g. no swelling, fibre raising, cracking, blistering.
4=Minor change:
Test area distinguishable from adjacent surrounding area, only when the light source is mirrored on the test surface and is reflected towards the observers eye, e.g. discoloration, change in gloss and colour;
no change in the surfaces structure e.g. no swelling, fibre raising, cracking, blistering.
5=No change:
Test area indistinguishable from adjacent surrounding area.

Also gloss values and pencil hardness is evaluated on this coating when the panel is cooled down to room temperature.

Gloss values were measured using a micro-Tri-gloss meter at 20°, 60° and 85°.

The pencil hardness was using an Elcometer 501 Pencil hardness tester set. The pencils varying in lead hardness from 6B (softest) through 6H (hardest) are pushed into the film, and the hardest pencil that will not penetrate the film is noted.

The blocking is measured by casting a 100 m wet film onto Leneta chart 8B. The film is dried for 10 minutes at 22° C. (+/−2° C.) and relatively humidity of 50%+/−5% followed by 20 minutes at 50° C. The coating is allowed to cool to room temperature. Next pieces were cut and with the coated sides placed together under a load of 1 kg/cm$^2$ or 3 kg/cm$^2$ during 4 hours at room temperature using a Koehler Instrument Company blocking tester. After removal of the pressure the coated pieces were pulled apart. The blocking resistance was assessed on an assessment scale of 0 to 5, whereby a rating of 5 is the best and a rating of 0 is the worst. The blocking resistance was scored according to the following ranks:

0=75-100% sealed together, completely damaged.
1=25-75% sealed together, significant damage.
2=0-25% sealed together, some damage.
3=Moderate tack, no damage.
4=Slight tack, no damage.
5=No tack, no damage.

The König hardness is measured by casting a 150 m wet film on glass plate. The film is applied using a bird applicator and dried for 24 hours at 22° C. (+/−2° C.) and relatively humidity of 50%+/−5% before the hardness is measured. Next the panel is dried for 16 hrs at 50° C. The panel is allowed to cool down to 22° C. and the König hardness is measured again.

TABLE 1

Composition of Examples 1-7 and Comparative Experiments C1-C9

|  | Oligomer | wt. % Oligomer/ (Oligomer + MF1 + MF2) | Monomer feed MF1 | | | | Monomer feed MF2 | | | | Ratio MF1:MF2 |
|---|---|---|---|---|---|---|---|---|---|---|---|
|  |  |  | styrene (gram) | 2-EHA (gram) | HDDA (gram) | Tg (° C.) | Styrene (gram) | 2-EHA (gram) | LMCT (gram) | Tg (° C.) | |
| Ex |  |  |  |  |  |  |  |  |  |  |  |
| 1 | Polymer A | 20 | 159.3 | 141.3 | — | 10 | 300.6 | — | — | 100 | 1:1 |
| 2 | Polymer A | 20 | 300.6 | — | — | 100 | 159.3 | 141.3 | — | 10 | 1:1 |
| 3 | Polymer A | 15 | 150.6 | 133.6 | — | 10 | 284.2 | — | — | 100 | 1:1 |
| 4 | Polymer A | 20 | 299.1 | — | 1.5 | 100 | 159.3 | 141.3 | — | 10 | 1:1 |
| 5 | Polymer A | 20 | 126.3 | 174.4 | — | −5 | 254.0 | 46.6 | — | 65 | 1:1 |
| 6 | Polymer A | 20 | 239.0 | 211.9 | — | 10 | 150.3 | — | — | 100 | 3:1 |

TABLE 1-continued

Composition of Examples 1-7 and Comparative Experiments C1-C9

| | Oligomer | wt. % Oligomer/ (Oligomer + MF1 + MF2) | Monomer feed MF1 | | | | Monomer feed MF2 | | | | Ratio MF1:MF2 |
|---|---|---|---|---|---|---|---|---|---|---|---|
| | | | styrene (gram) | 2-EHA (gram) | HDDA (gram) | Tg (° C.) | Styrene (gram) | 2-EHA (gram) | LMCT (gram) | Tg (° C.) | |
| 7 | Polymer A | 30 | 124.2 | 110.1 | — | 10 | 234.2 | — | — | 100 | 1:1 |
| 8 | Polymer A | 20 | 159.3 | 141.3 | — | 10 | 291.59 | — | 9.02 | 100 | 1:1 |
| CEx | | | | | | | | | | | |
| C1 | SR10PG | 20 | 159.3 | 141.3 | — | 10 | 300.6 | — | — | 100 | 1:1 |
| C2 | Polymer A | 20 | 459.9 | 141.3 | — | 49 | — | — | — | — | — |
| C3 | Polymer A | 20 | 214.9 | 85.7 | — | 40 | 300.6 | — | — | 100 | 1:1 |
| C4 | Polymer A | 20 | 261.5 | 39.1 | — | 70 | 300.6 | — | — | 100 | 1:1 |
| C5 | Polymer A | 20 | 376.4 | 224.9 | — | 25 | — | — | — | — | — |
| C6 | Polymer A | 20 | 412.4 | 188.8 | — | 35 | — | — | — | — | — |
| C7 | Polymer A | 20 | 61.6 | 239.0 | — | −30 | 231.5 | 69.1 | — | 50 | 1:1 |
| C8 | Polymer A | 20 | 61.6 | 239.0 | — | −30 | 178.9 | 121.8 | — | 20 | 1:1 |
| C9 | Polymer A | 20 | 159.3 | 141.3 | — | 10 | 216.4 | 84.2 | — | 40 | 1:1 |

TABLE 2

Specifications

| | pH | Particle size (nm) | Solid content (%) | Viscosity (m.Pa.s. @ 20° C.) | MFFT (° C.) |
|---|---|---|---|---|---|
| Example | | | | | |
| 1 | 7.4 | 62 | 42.0 | 115 | 78 |
| 2 | 7.4 | 59 | 42.3 | 120 | 74 |
| 3 | 7.4 | 63 | 41.8 | 100 | 66 |
| 4 | 7.6 | 86 | 42.8 | 30 | 72 |
| 5 | 7.3 | 69 | 42.8 | 55 | 48 |
| 6 | 7.4 | 57 | 41.1 | 75 | 38 |
| 7 | 7.4 | 51 | 40.6 | 130 | 90 |
| 8 | 7.5 | 94 | 42.2 | 50 | 55 |
| Comparative Experiment | | | | | |
| C1 | 8.8 | 180 | 42.3 | 25 | 32 |
| C2 | 7.5 | 60 | 42.4 | 115 | 70 |
| C3 | 7.4 | 58 | 41.1 | 80 | 90 |
| C4 | 7.3 | 60 | 41.5 | 70 | >95 |
| C5 | 7.5 | 67 | 42.5 | 65 | 34 |
| C6 | 7.4 | 66 | 42.7 | 60 | 46 |
| C7 | 7.6 | 68 | 43.0 | 90 | 24 |
| C8 | 7.5 | 67 | 43.0 | 80 | <5 |
| C9 | 7.5 | 53 | 41.2 | 85 | 38 |

Clear glossy formulations were prepared using the ingredients and amounts (in grams) as listed in Table 3. In Tables 4-7 the test data on the clear glossy formulations is presented.

TABLE 3

Clear glossy formulations

| | Formulation 1 | Additional formulation for Ex 1 (Formulation 2) |
|---|---|---|
| Binder | 73.5 | 73.5 |
| Demineralized water | 9.9 | 13.5 |
| BG/DPnB/water 3/2/1 | 15.0 | 11.4 |
| Tego Airex 902W | 0.6 | 0.6 |
| Rheovis PU1190/DPM 1:1 | 1.0 | 1.0 |
| VOC (g/l) | 129 | 98 |

TABLE 4

Test data mechanical properties clear glossy coatings.

| | Example 1-Formulation 1 | Example 3-Formulation 1 | Example 4-Formulation 1 | Example 1-Formulation 2 |
|---|---|---|---|---|
| Gloss (%) | | | | |
| 20° | 88 | 91 | 90 | 85 |
| 60° | 100 | 100 | 100 | 98 |
| 85° | 97 | 98 | 98 | 99 |
| König hardness (24 h at RT) (sec) | 63 | 60 | 81 | 103 |
| König hardness (24 h at RT + 16 h at 50° C.) (sec) | 150 | 148 | 153 | 141 |
| Pencil hardness | B | HB | B | B |
| Blocking (1 kg/cm$^2$) | 4-5 | 4-5 | 4-5 | 5 |
| Blocking (3 kg/cm$^2$) | 4-5 | 4 | 4 | 4 |

TABLE 5

Test data chemical resistances clear glossy coatings as tested according to DIN 68861-1B norm and IKEA R2.

|  | Example 1-Formulation 1 | Example 3-Formulation 1 | Example 4-Formulation 1 | Example 1-Formulation 2 |
|---|---|---|---|---|
| IKEAR2 | | | | |
| Water 24 hours | 5 | 5 | 5 | 5 |
| EtOH (48%) 1 hour | 5 | 5 | 5 | 5 |
| Coffee 1 hour | 5 | 5 | 5 | 5 |
| Total | 15 | 15 | 15 | 15 |
| DIN 68861-1B | | | | |
| EtOH (48%) 1 hour | 5 | 5 | 5 | 5 |
| Red wine 6 hours | 5 | 5 | 5 | 5 |
| Coffee 16 hours | 5 | 5 | 4 | 5 |
| Water 16 hours | 5 | 5 | 5 | 5 |
| Mustard 6 hours | 5 | 5 | 5 | 5 |
| Onions 6 hours | 5 | 5 | 5 | 5 |
| Total | 30 | 30 | 29 | 30 |

TABLE 6

Test data mechanical properties clear glossy coatings.

|  | C2-Formulation 1 | C5-Formulation 1 | C6-Formulation 1 | C7-Formulation 1 | C8-Formulation 1 | C9-Formulation 1 |
|---|---|---|---|---|---|---|
| Gloss (%) | | | | | | |
| 20° | 95 | 69 | 58 | 84 | 81 | 90 |
| 60° | 101 | 87 | 79 | 97 | 95 | 100 |
| 85° | 90 | 88 | 83 | 97 | 96 | 98 |
| König hardness (24 h at RT) (sec) | 50 | 28 | 48 | 64 | 22 | 25 |
| König hardness (24 h at RT + 16 h at 50° C.) (sec) | 174 | 143 | 170 | 76 | 27 | 116 |
| Pencil hardness | B | HB | B | 3B | 4B | B |
| Blocking (1 kg/cm$^2$) | 2 | 0 | 0 | 1 | 0 | 1 |
| Blocking (3 kg/cm$^2$) | 2 | 0 | 0 | 1 | 0 | 1 |

TABLE 7

Test data chemical resistances clear glossy coatings as tested according to DIN 68861-1B norm and IKEA R2.

|  | C2-Formulation 1 | C5-Formulation 1 | C6-Formulation 1 | C7-Formulation 1 | C8-Formulation 1 | C9-Formulation 1 |
|---|---|---|---|---|---|---|
| IKEAR2 | | | | | | |
| Water 24 hours | 5 | 5 | 5 | 5 | 5 | 5 |
| EtOH (48%) 1 hour | 5 | 5 | 5 | 5 | 4 | 5 |
| Coffee 1 hour | 5 | 5 | 5 | 3 | 3 | 5 |
| Total | 15 | 15 | 15 | 13 | 12 | 15 |
| DIN 68861-1B | | | | | | |
| EtOH (48%) 1 hour | 5 | 5 | 5 | 5 | 4 | 5 |
| Red wine 6 hours | 5 | 5 | 5 | 5 | 4 | 5 |
| Coffee 16 hours | 5 | 5 | 5 | 2 | 2 | 5 |
| Water 16 hours | 5 | 5 | 5 | 5 | 5 | 5 |
| Mustard 6 hours | 5 | 5 | 5 | 2 | 1 | 5 |
| Onions 6 hours | 5 | 5 | 5 | 5 | 5 | 5 |
| Total | 30 | 30 | 30 | 26 | 21 | 30 |

Example 1—Formulation 2 shows that lowering the VOC level from 129 g/L to a VOC level of even 98 g/L still resulted in good performance.

Comparative Experiment 3 and 4, in which the $T_g$ of polymer B1 is too high, did not form defect-free films even when VOC levels were increased well above 141 g/l. Therefore, the gloss values, the mechanical properties and chemical resistances have not been assessed. Since also for clear satin, pigmented glossy and pigmented satin formulations prepared from the binder of Comparative Experiment 3 and 4, a defect-free film cannot be obtained even with such a high amount of coalescent (>>141 g/i), the gloss values, the mechanical properties and chemical resistances have also not been assessed for these formulations.

Comparative Experiments 2, 5 and 6, in which a polymer system with a single polymer phase is applied, showed poor blocking for all three tested polymer $T_g$'s; 25, 35 and 49° C.

Comparative Experiment 7, in which the $T_g$ of polymer B1 is too low, showed poor stain resistance (IKEA R2: coffee 1 hrs; DIN 68861-1B:coffee 16 hrs/mustard 6 hrs) and low pencil/König hardness and poor anti-blocking properties.

Comparative Experiment 8, in which the $T_g$ of polymer B1 and B2 are too low, showed poor stain resistance (IKEA R2: coffee 1 hrs; DIN 68861-1B:coffee 16 hrs/mustard 6 hours) and low pencil/König hardness and poor anti-blocking properties.

Comparative Experiment 9, in which the $T_g$ of polymer B2 is too low, showed poor anti-blocking properties.

Clear satin formulations were prepared using the ingredients and amounts (in grams) as listed in Table 8. In Tables 9 and 10 the test data on the clear satin formulations with VOC 98 g/L is presented.

TABLE 8

Clear satin formulations

|  |  | Additional formulation for Ex 1 and C2 |
| --- | --- | --- |
| Binder (gram) | 73.0 | 73.0 |
| Demineralized water | 8.3 | 5.5 |
| BG/DPnB/water 3/2/1 | 11.4 | 15.0 |
| Tego Airex 902W | 0.6 | 0.6 |
| Ceridust 9615 | 5.0 | 5.0 |
| Rheovis PU1190/DPM 1:1 | 0.7 | 0.7 |
| Demineralized water | 1.0 | 0.2 |
| VOC (g/l) | 98 | 128 |

For C2, the amount of coalescent used (resulting in VOC of 98 g/L) is too little to give a defect free coating resulting in the appearance of cracks in the coating. Even when the amount of coalescent was increased to a VOC level of 128 g/L which is just below the VOC norm of 130 g/L as listed in the IKEA Specification IOS-MAT-0066 version AA-163938-9, dd 17-01-2014 (see additional formulation in Table 8), a crack-free coating could not be obtained. See FIG. 2. Therefore, the gloss values, the mechanical properties and chemical resistances have not been assessed.

Figure 2:
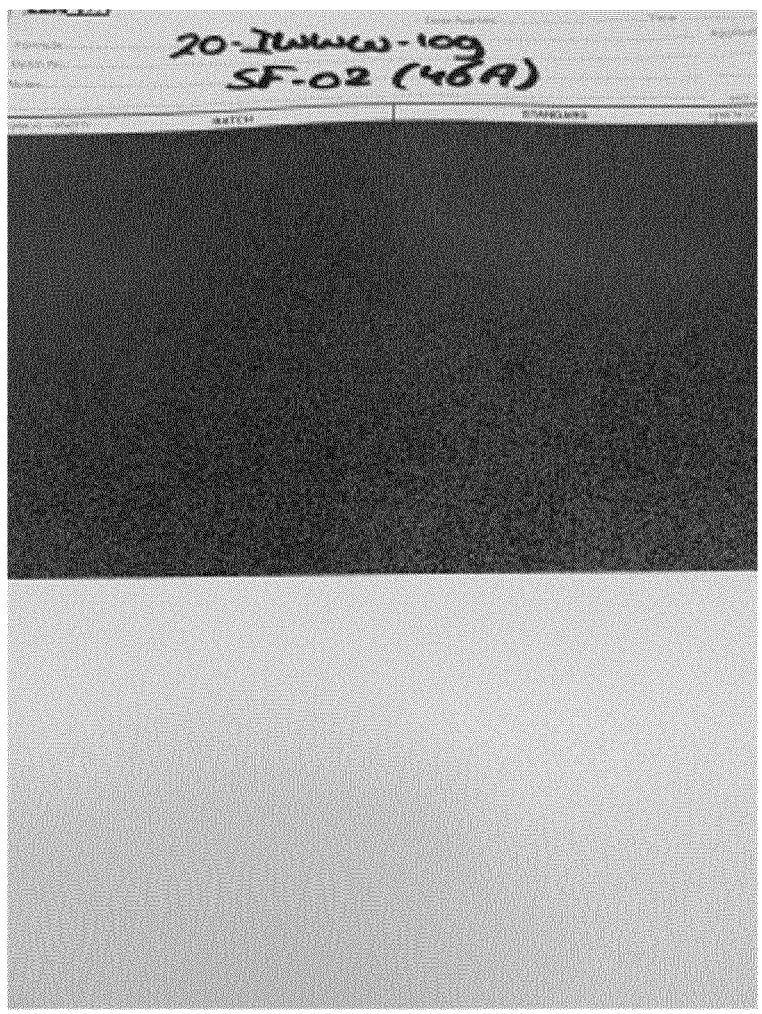

FIGS. 1 and 2

Of Example 1-Additional formulation with VOC of 128 g/L (FIG. 1) and Comparative Experiment C2-Additional formulation with VOC of 128 g/L (FIG. 2), photos of coated Leneta charts have been taken. The clear satin formulation was casted as a 150 m wet film onto a Leneta chart which was allowed to dry for 24 hours at 22° C. (+/−2° C.) and relatively humidity of 50%+/−5%. FIG. 1 shows a crack-free coating. FIG. 2 shows a coating with high amount of cracks.

TABLE 9

Test data mechanical properties clear satin coatings.

|  | Ex 1 | Ex 2 | C1 |
| --- | --- | --- | --- |
| Gloss (%) |  |  |  |
| 20° | 3 | 3 | 2 |
| 60° | 20 | 21 | 15 |
| 85° | 32 | 36 | 31 |
| König hardness (24 h at RT) (sec) | 77 | 78 | 70 |
| König hardness (24 h at RT + 16 h at 50° C.) (sec) | 109 | 115 | 102 |
| Pencil hardness | B | B | B |
| Blocking (1 kg /cm$^2$) | 5 | 5 | 5 |
| Blocking (3 kg /cm$^2$) | 5 | 5 | 5 |

TABLE 10

Test data chemical resistances clear satin coatings as tested according to DIN 68861-1B norm and IKEA R2.

|  | Ex 1 | Ex 2 | C1 |
| --- | --- | --- | --- |
| IKEAR2 |  |  |  |
| Water 24 hours | 5 | 5 | 5 |
| EtOH (48%) 1 hour | 5 | 5 | 2 |
| Coffee 1 hour | 5 | 5 | 5 |
| Total | 15 | 15 | 12 |
| DIN 68861-1B |  |  |  |
| EtOH (48%) 1 hour | 5 | 5 | 2 |
| Red wine 6 hours | 5 | 5 | 5 |
| Coffee 16 hours | 5 | 5 | 5 |
| Water 16 hours | 5 | 5 | 5 |
| Mustard 6 hours | 5 | 5 | 5 |
| Onions 6 hours | 5 | 5 | 5 |
| Total | 30 | 30 | 27 |

Comparative Experiment 1 C1 shows that in clear satin coatings the binder prepared with an oligomer with a higher acid value has poor EtOH resistance.

Pigmented glossy formulations were prepared using the ingredients and amounts (in grams) as listed in Table 11. In Tables 12 and 13 the test data on the pigmented glossy formulations is presented.

TABLE 11

Pigmented glossy formulations.

|  | Formulation 3 | Additional formulation for Ex 1 - Formulation 4 |
| --- | --- | --- |
| Binder | 55.0 | 55.0 |
| Demineralized water | 6.9 | 11.8 |
| Tego Airex 902W | 0.6 | 0.6 |
| BG/DPnB/water 3/2/1 | 12.0 | 8.4 |
| Demineralized water | 3.3 | 3.3 |
| Disperbyk 2015 | 1.2 | 1.2 |
| Rheovis PU1190/DPM 1:1 | 0.02 | 0.02 |
| Tioxide TR92 | 18.8 | 18.8 |
| Tego Foamex 810 | 0.2 | 0.2 |
| Rheovis PU1190/DPM 1:1 | 2.0 | 0.7 |
| VOC (g/l) | 121 | 84 |

For C2, pigmented glossy, a defect-free coating could be obtained with a VOC level of 121 g/L. Although the VOC level of the clear satin formulation is higher than of the pigmented glossy formulation, the pigmented glossy formulation has a higher coalescent/binder weight ratio.

TABLE 12

Test data mechanical properties pigmented glossy coatings.

| | Ex 1-Form 3 | Ex 2-Form 3 | C1-Form 3 | C2-Form 3 | Ex 1-Form 4 |
|---|---|---|---|---|---|
| Gloss (%) | | | | | |
| 20° | 47 | 42 | 34 | 65 | 47 |
| 60° | 83 | 83 | 76 | 92 | 83 |
| 85° | 97 | 95 | 95 | 98 | 97 |
| König hardness (24 h at RT) (sec) | 73 | 67 | 60 | 35 | 64 |
| König hardness (24 h at RT + 16 h at 50° C.) (sec) | 115 | 125 | 112 | 134 | 113 |
| Pencil hardness | B | B | B | B | B |
| Blocking (1 kg /cm$^2$) | 5 | 5 | 5 | 1 | 5 |
| Blocking (3 kg /cm$^2$) | 4 | 4 | 4 | 1 | 4 |

TABLE 13

Test data chemical resistances pigmented glossy coatings as tested according to DIN 68861-1B norm and IKEA R2.

| | Ex 1-Form 3 | Ex 2-Form 3 | C1-Form 3 | C2-Form 3 | Ex 1-Form 4 |
|---|---|---|---|---|---|
| IKEAR2 | | | | | |
| Water 24 hours | 5 | 5 | 5 | 5 | 5 |
| EtOH (48%) 1 hour | 5 | 5 | 2 | 5 | 5 |
| Coffee 1 hour | 5 | 5 | 5 | 5 | 5 |
| Total | 15 | 15 | 13 | 15 | 15 |
| DIN 68861-1B | | | | | |
| EtOH (48%) 1 hour | 5 | 5 | 2 | 5 | 5 |
| Red wine 6 hours | 5 | 5 | 5 | 5 | 5 |
| Coffee 16 hours | 5 | 5 | 5 | 5 | 5 |
| Water 16 hours | 5 | 5 | 5 | 5 | 5 |

TABLE 13-continued

Test data chemical resistances pigmented glossy coatings as tested according to DIN 68861-1B norm and IKEA R2.

| | Ex 1-Form 3 | Ex 2-Form 3 | C1-Form 3 | C2-Form 3 | Ex 1-Form 4 |
|---|---|---|---|---|---|
| Mustard 6 hours | 5 | 5 | 5 | 5 | 5 |
| Onions 6 hours | 5 | 5 | 5 | 5 | 5 |
| Total | 30 | 30 | 27 | 30 | 30 |

Example 1—Formulation 4 shows that lowering the VOC level from 121 g/L to a VOC level of even 84 g/L still resulted in good performance. The results show that in pigmented glossy coatings the binder with a single Tg 49° C. polymer phase shows poor anti-blocking (Comparative Experiment C2) and the binder prepared with an oligomer with a higher acid value (Comparative Experiment C1) has poor EtOH resistance.

Pigmented satin formulations were prepared using the ingredients and amounts (in grams) as listed in Table 14. In Tables 15-18 the test data on the pigmented satin formulations is presented.

TABLE 14

Pigmented satin formulations.

| | Formulation 5 | Additional formulation for Ex 1- Formulation 6 |
|---|---|---|
| Binder | 55.0 | 55.0 |
| Demineralized water | 4.0 | 8.0 |
| Tego Airex 902W | 0.6 | 0.6 |
| BG/DPnB/water 3/2/1 | 12.0 | 8.4 |
| Demineralized water | 3.3 | 3.3 |
| Disperbyk 2015 | 1.2 | 1.2 |
| Rheovis PU1190/DPM 1:1 | 0.02 | 0.02 |
| Tioxide TR92 | 18.8 | 18.8 |
| Tego Foamex 810 | 0.2 | 0.2 |
| Ceridust 9615 | 4.0 | 4.0 |
| Rheovis PU1190/DPM 1:1 | 0.9 | 0.5 |
| VOC (g/l) | 120.0 | 84.0 |

For C2, a crack-free coating could not be obtained. Therefore, the gloss values, the mechanical properties and chemical resistances have not been assessed.

All the binders of the examples according to the invention are tested in the pigmented satin formulation, which is the most challenging formulation.

TABLE 15

Test data mechanical properties pigmented satin coatings.

| | Ex 1-Form 5 | Ex 2-Form 5 | Ex 3-Form 5 | Ex 4-Form 5 | Ex 5-Form 5 | Ex 6-Form 5 | Ex 7-Form 5 | Ex 8-Form 5 | Ex 1-Form 6 |
|---|---|---|---|---|---|---|---|---|---|
| Gloss (%) | | | | | | | | | |
| 20° | 3 | 3 | 4 | 4 | 4 | 3 | 3 | 5 | 4 |
| 60° | 20 | 19 | 22 | 24 | 21 | 15 | 20 | 26 | 21 |
| 85° | 47 | 48 | 59 | 57 | 52 | 40 | 58 | 58 | 38 |
| König hardness (24 h at RT) (sec) | 69 | 64 | 68 | 57 | 62 | 36 | 82 | 67 | 80 |
| König hardness (24 h at RT + 16 h at 50° C.) (sec) | 116 | 113 | 110 | 112 | 98 | 85 | 123 | 112 | 111 |
| Pencil hardness | B | B | B | B | B | B | B | 2B | B |
| Blocking (1 kg/cm$^2$) | 5 | 5 | 5 | 5 | 5 | 5 | 5 | 5 | 5 |
| Blocking (3 kg/cm$^2$) | 5 | 5 | 5 | 5 | 5 | 5 | 5 | 5 | 5 |

TABLE 16

Test data chemical resistances pigmented satin coatings as tested according to DIN 68861-1B norm and IKEA R2.

| | Ex 1-Form 5 | Ex 2-Form 5 | Ex 3-Form 5 | Ex 4-Form 5 | Ex 5-Form 5 | Ex 6-Form 5 | Ex 7-Form 5 | Ex 8-Form 5 | Ex 1-Form 6 |
|---|---|---|---|---|---|---|---|---|---|
| IKEAR2 | | | | | | | | | |
| Water 24 hours | 5 | 5 | 5 | 5 | 5 | 5 | 5 | 5 | 5 |
| EtOH (48%) 1 hour | 5 | 5 | 5 | 5 | 5 | 5 | 5 | 5 | 5 |
| Coffee 1 hour | 5 | 5 | 5 | 5 | 5 | 5 | 5 | 5 | 5 |
| Total | 15 | 15 | 15 | 15 | 15 | 15 | 15 | 15 | 15 |
| DIN 68861-1B | | | | | | | | | |
| EtOH (48%) 1 hour | 5 | 5 | 5 | 5 | 5 | 5 | 5 | 5 | 5 |
| Red wine 6 hours | 5 | 5 | 5 | 5 | 5 | 5 | 5 | 5 | 5 |
| Coffee 16 hours | 4 | 4 | 4 | 4 | 3 | 5 | 4 | 4 | 5 |
| Water 16 hours | 5 | 5 | 5 | 5 | 5 | 5 | 5 | 5 | 5 |
| Mustard 6 hours | 5 | 5 | 5 | 5 | 5 | 5 | 5 | 5 | 5 |
| Onions 6 hours | 5 | 5 | 5 | 5 | 5 | 5 | 5 | 5 | 5 |
| Total | 29 | 29 | 29 | 29 | 28 | 30 | 29 | 29 | 30 |

TABLE 17

Test data mechanical properties pigmented satin coatings.

| | C1-Formulation 5 | C7-Formulation 5 | C8-Formulation 5 | C9-Formulation 5 |
|---|---|---|---|---|
| Gloss (%) | | | | |
| 20° | 5 | 3 | 3 | 3 |
| 60° | 27 | 18 | 19 | 14 |
| 85° | 64 | 51 | 54 | 39 |
| König hardness (24 h at RT) (sec) | 66 | 45 | 28 | 30 |
| König hardness (24 h at RT + 16 h at 50° C.) (sec) | 94 | 70 | 32 | 95 |
| Pencil hardness | B | 5B | 3B | 3B |
| Blocking (1 kg/cm$^2$) | 5 | 5 | 5 | 5 |
| Blocking (3 kg/cm$^2$) | 5 | 5 | 4-5 | 5 |

TABLE 18

Test data chemical resistances pigmented satin coatings as tested according to DIN 68861-1B norm and IKEA R2.

| | C1-Formulation 5 | C7-Formulation 5 | C8-Formulation 5 | C9-Formulation 5 |
|---|---|---|---|---|
| IKEAR2 | | | | |
| Water 24 hours | 5 | 5 | 5 | 5 |
| EtOH (48%) 1 hour | 2 | 5 | 5 | 4 |
| Coffee 1 hour | 5 | 4 | 4 | 5 |
| Total | 12 | 14 | 14 | 14 |
| DIN 68861-1B | | | | |
| EtOH (48%) 1 hour | 2 | 5 | 5 | 4 |
| Red wine 6 hours | 5 | 5 | 5 | 5 |
| Coffee 16 hours | 4 | 2 | 2 | 4 |

TABLE 18-continued

Test data chemical resistances pigmented satin coatings
as tested according to DIN 68861-1B norm and IKEA R2.

| | C1-<br>Formulation 5 | C7-<br>Formulation 5 | C8-<br>Formulation 5 | C9-<br>Formulation 5 |
|---|---|---|---|---|
| Water 16 hours | 5 | 5 | 5 | 5 |
| Mustard 6 hours | 5 | 4 | 3 | 5 |
| Onions 6 hours | 5 | 4 | 4 | 5 |
| Total | 26 | 25 | 24 | 28 |

Example 1—Formulation 6 shows that lowering the VOC level from 120 g/L to a VOC level of even 84 g/L still resulted in good performance.

Comparative Experiment 1 C1 shows that in pigmented satin coatings the binder prepared with an oligomer with a higher acid value has poor EtOH resistance.

Comparative Experiment C7, in which the $T_g$ of polymer B1 is too low, showed poor stain resistance (DIN 68861-1B: coffee 16 hrs) and low pencil/König hardness.

Comparative Experiment C8, in which the $T_g$ of polymer B1 and B2 are too low, showed poor stain resistance (DIN 68861-1B coffee 16 hrs) and low pencil/König hardness.

Comparative Experiment C9, in which the $T_g$ of polymer B2 is too low, showed low pencil hardness.

The invention claimed is:

1. A process for preparing an aqueous polymer dispersion, wherein the process comprises:
   a free-radically initiated emulsion polymerization in an aqueous medium, in the presence of at least one vinyl polymer A, to obtain a polymer B comprising a vinyl polymer phase B1 with a glass transition temperature, calculated by means of the Fox equation, of from −20 to +15° C. and a vinyl polymer phase B2 with a glass transition temperature, calculated by means of the Fox equation, of from +50 to +110° C., with the proviso that the difference in glass transition temperature between polymer B1 and polymer B2 is at least 40° C.,
   wherein:
   the weight ratio of polymer B1 to polymer B2 is from 80:10 to 10:20,
   the at least one polymer A is obtained by a process comprising:
   free-radically initiated bulk or solution polymerizing of:
   from 5 to 25 wt. % of at least one carboxylic acid functional ethylenically unsaturated monomer A1, and
   from 75 to 95 wt. % of at least one ethylenically unsaturated monomer A2 different than monomer A1,
   where the amounts are given relative to the total weight of monomers charged in the polymerization to prepare the vinyl polymer A,
   the glass transition temperature of the at least one vinyl polymer A, calculated by means of the Fox equation, is from 40 to 150° C.,
   the weight average molecular weight of the at least one polymer A, determined via SEC, is from 1000 to 70000 g/mol,
   the weight average molecular weight of the polymer A is lower than the weight average molecular weight of the polymer B, determined via SEC, and
   the weight ratio of polymer A to polymer B is from 10:90 to 40:60.

2. The process according to claim 1, wherein the process for preparing the at least one polymer A further comprises deprotonating at least part of the carboxylic acid groups to obtain polymer A.

3. The process according to claim 1, wherein the process further comprises, prior to the free-radically initiated emulsion polymerization to obtain polymer B, dispersing the at least one polymer A in water.

4. The process according to claim 1, wherein from 10 to 22.5 wt. % of monomers A1 and from 77.5 to 90 wt. % of monomers A2 are used, where the amounts are given relative to the total weight of monomers charged in the polymerization to prepare the vinyl polymer A.

5. The process according to claim 1, wherein the amounts of monomers A1 and A2 add up to 100 wt. %.

6. The process according to claim 1, wherein the monomer A1 is selected from the group consisting of acrylic acid, methacrylic acid, β-carboxyethyl acrylate, citraconic acid, crotonic acid, fumaric acid, itaconic acid, monoalkyl esters of itaconic acid, and anhydrides of carboxylic acid functional olefinically unsaturated monomers, and combinations thereof.

7. The process according to claim 1, wherein the monomer A2 is selected from the group consisting of acrylates, methacrylates, arylalkylenes, dienes, vinyl esters, nitriles, olefinically unsaturated halides and any mixture thereof.

8. The process according to claim 1, wherein the weight average molecular weight of the at least one polymer A is from 5000 to 60000 g/mol.

9. The process according to claim 1, wherein the glass transition temperature of the at least one vinyl polymer A is from 60 to 140° C.

10. The process according to claim 1, wherein the monomers A1 and A2 are chosen such that the at least one polymer A has a Hansch parameter higher than 1.35 and at most 2.20, wherein the Hansch parameter is calculated using the group contribution method.

11. The process according to claim 1, wherein the difference in glass transition temperature between polymer B1 and polymer B2 is at least 50° C.

12. The process according to claim 1, wherein the polymer phase B1 is prepared by a free radically initiated aqueous emulsion polymerization in the presence of the vinyl polymer A of:
   from 0 to 5 wt. % of at least one carboxylic acid functional ethylenically unsaturated monomer B1.1, and
   from 95 to 100 wt. % of at least one ethylenically unsaturated monomer B1.2 different than monomer B1.1, where the amounts are given relative to the total weight of monomers charged in the polymerization to prepare the vinyl polymer B1, and wherein
the polymer phase B2 is prepared by a free-radically initiated aqueous emulsion polymerization in the presence of the polymer A of:
from 0 to 5 wt. % of at least one carboxylic acid functional ethylenically unsaturated monomer B2.1, and
from 95 to 100 wt. % of at least one ethylenically unsaturated monomer B2.2 different than monomer B2.1, where the amounts are given relative to the total weight of monomers charged in the polymerization to prepare the vinyl polymer B2,
and wherein
the monomers B1.2 and B2.2 are independently selected from the group consisting of acrylates, methacrylates, arylalkylenes, dienes, vinyl esters, nitriles, olefinically unsaturated halides and any mixture thereof,
and wherein
the monomers B1.2 and B2.2 may optionally have functional groups selected from the group consisting of silane, epoxy, hydroxyl, ketone, aldehyde groups, and at least two nonconjugated ethyllenically unsaturated double bonds.

13. The process according to claim 1, wherein the weight ratio of polymer B1 to polymer B2 is from 80:10 to 10:20.

14. The process according to claim 1, wherein the polymer B1 and B2 independently have a Hansch parameter higher than 1.20 and at most 4.00, wherein the Hansch parameter is calculated using the group contribution.

15. The process according to claim 1, wherein preparing the polymer phase B1 is effected prior to preparing the polymer phase B2, or vice versa.

16. The process according to claim 1, wherein the weight average molecular weight of polymer B1, determined via SEC, is at least 100000 g/mol and the weight average molecular weight of polymer B2, determined via SEC, is lower than 100000 g/mol.

17. The process according to claim 1, wherein the weight average molecular weight of polymer B1 and polymer B2, each of which is determined via SEC, is at least 100000 g/mol.

18. The process according to claim 1, wherein the polymer B consists of the two polymer phases B1 and B2.

19. The process according to claim 1, wherein the weight ratio of polymer A to polymer B is from 15:85 to 35:65.

20. An aqueous polymer dispersion obtained by the process according to claim 1.

21. The aqueous polymer dispersion according to claim 20, wherein the amount of polymer A, polymer B1 and polymer B2 together in the aqueous polymer dispersion is more than 60 wt. %, based on the solids content of the aqueous polymer dispersion.

22. An aqueous coating formulation comprising the aqueous polymer dispersion according to claim 20.

23. The aqueous coating formulation according to claim 22, wherein an amount of coalescent present in the aqueous coating formulation is less than 130 g/l.

24. A coated furniture obtained by applying the aqueous coating formulation according to claim 22 onto furniture, to form a coating thereon, and drying the coating.

25. The process according to claim 12, wherein the monomers of polymer B1.1 and polymer B2.2 are independently selected from the group consisting of acrylates, methacrylates, arylalkylenes, and any mixture thereof.

26. The process according to claim 12, wherein the monomers B1.2 and B2.2 are independently selected from the group consisting of acrylates, methacrylates, arylalkylenes, and any mixture thereof.

27. The process according to claim 1, wherein the monomer A1 is selected from the group consisting of acrylic acid, methacrylic acid, itaconic acid, fumaric acid and mixtures thereof.

28. The process according to claim 1, wherein the monomer A1 is methacrylic acid and/or acrylic acid.

29. The process according to claim 1, wherein the monomer A2 is selected from the group consisting of acrylates, methacrylates, arylalkylenes and any mixture thereof.

30. The process according to claim 1, wherein the monomer A2 is selected from the group consisting of methyl (meth)acrylate, ethyl (meth)acrylate, 4-methyl-2-pentyl (meth)acrylate, 2-methylbutyl (meth)acrylate, iso-amyl (meth)acrylate, sec-butyl (meth)acrylate, n-butyl (meth)acrylate, 2-ethylhexyl (meth)acrylate, 2-octyl (meth)acrylate, lauryl (meth)acrylate, iso-decyl (meth)acrylate, cyclohexyl (meth)acrylate, iso-bornyl (meth)acrylate and/or mixtures thereof.

31. The process according to claim 1, wherein the monomer A2 is selected from the group consisting of methyl acrylate, methyl methacrylate, ethyl acrylate, ethyl methacrylate, n-butyl methacrylate, n-butyl acrylate, 2-ethylhexyl acrylate, 2-ethylhexyl methacrylate, styrene, α-methyl styrene and any mixture thereof.

32. The process according to claim 1, wherein the monomer A2 is selected is selected from the group consisting of styrene, α-methyl styrene, methyl methacrylate, n-butyl acrylate, 2-ethylhexyl acrylate and any mixture thereof; especially the monomer A2 is styrene and/or α-methylstyrene.

33. The process according to claim 1, wherein the monomer A2 is styrene and/or α-methylstyrene.

34. The process according to claim 12, wherein the process for preparing the at least one polymer A further comprises deprotonating at least part of the carboxylic acid groups to obtain polymer A.

35. The process according to claim 12, wherein the process further comprises, prior to the free-radically initiated emulsion polymerization to obtain polymer B, dispersing the at least one polymer A in water.

36. The process according to claim 12, wherein from 10 to 22.5 wt. % of monomers A1 and from 77.5 to 90 wt. % of monomers A2 are used where the amounts are given relative to the total weight of monomers charged in the polymerization to prepare the vinyl polymer A.

37. The process according to claim 12, wherein the amounts of monomers A1 and A2 add up to 100 wt. %.

38. The process according to claim 12, wherein the monomer A1 is selected from the group consisting of acrylic acid, methacrylic acid, β-carboxyethyl acrylate, citraconic acid, crotonic acid, fumaric acid, itaconic acid, monoalkyl esters of itaconic acid, and anhydrides of carboxylic acid functional olefinically unsaturated monomers, and combinations thereof.

39. The process according to claim 12, wherein the monomer A1 is selected from the group consisting of acrylic acid, methacrylic acid, itaconic acid, fumaric acid and mixtures thereof.

40. The process according to claim 12, wherein the monomer A1 is methacrylic acid and/or acrylic acid.

41. The process according to claim 12, wherein the monomer A2 is selected from the group consisting of acrylates, methacrylates, arylalkylenes, dienes, vinyl esters, nitriles, olefinically unsaturated halides and any mixture thereof.

42. The process according to claim 12, wherein the monomer A2 is selected from the group consisting of acrylates, methacrylates, arylalkylenes and any mixture thereof.

43. The process according to claim 12, wherein the monomer A2 is selected from the group consisting of methyl (meth)acrylate, ethyl (meth)acrylate, 4-methyl-2-pentyl (meth)acrylate, 2-methylbutyl (meth)acrylate, iso-amyl (meth)acrylate, sec-butyl (meth)acrylate, n-butyl (meth)acrylate, 2-ethylhexyl (meth)acrylate, 2-octyl (meth)acrylate, lauryl (meth)acrylate, iso-decyl (meth)acrylate, cyclohexyl (meth)acrylate, iso-bornyl (meth)acrylate and/or mixtures thereof.

44. The process according to claim 12, wherein the monomer A2 is selected from the group consisting of methyl acrylate, methyl methacrylate, ethyl acrylate, ethyl methacrylate, n-butyl methacrylate, n-butyl acrylate, 2-ethylhexyl acrylate, 2-ethylhexyl methacrylate, styrene, α-methyl styrene and any mixture thereof.

45. The process according to claim 12, wherein the monomer A2 is selected is selected from the group consisting of styrene, α-methyl styrene, methyl methacrylate, n-butyl acrylate, 2-ethylhexyl acrylate and any mixture thereof; especially the monomer A2 is styrene and/or α-methylstyrene.

46. The process according to claim 12, wherein the monomer A2 is styrene and/or α-methylstyrene.

47. The process according to claim 12, wherein the weight average molecular weight of the at least one polymer A is from 5000 to 60000 g/mol.

48. The process according to claim 12, wherein the glass transition temperature of the at least one vinyl polymer A is from 60 to 140° C.

49. The process according to claim 12, wherein the monomers A1 and A2 are chosen such that the at least one polymer A has a Hansch parameter higher than 1.35 and at most 2.20, wherein the Hansch parameter is calculated using the group contribution.

50. The process according to claim 1, wherein the difference in glass transition temperature between polymer B1 and polymer B2 is at least 50° C.

51. The process according to claim 1, wherein the difference in glass transition temperature between polymer B1 and polymer B2 is at least 60° C.

52. The process according to claim 1, wherein the difference in glass transition temperature between polymer B1 and polymer B2 is at least 70° C.

53. The process according to claim 12, wherein the difference in glass transition temperature between polymer B1 and polymer B2 is at least 50° C.

54. The process according to claim 12, wherein the difference in glass transition temperature between polymer B1 and polymer B2 is at least 60° C.

55. The process according to claim 12, wherein the difference in glass transition temperature between polymer B1 and polymer B2 is at least 70° C.

56. The process according to claim 12, wherein the monomers B1.2 and B2.2 are independently selected from the group consisting of methyl (meth)acrylate, ethyl (meth)acrylate, 4-methyl-2-pentyl (meth)acrylate, 2-methylbutyl (meth)acrylate, isoamyl (meth)acrylate, sec-butyl (meth)acrylate, n-butyl (meth)acrylate, tert-butyl (meth)acrylate, 2-ethylhexyl (meth)acrylate, 2-octyl (meth)acrylate, lauryl (meth)acrylate, iso-decyl (meth)acrylate, cyclohexyl (meth)acrylate and/or mixtures thereof.

57. The process according to claim 12, wherein the monomers B1.2 and B2.2 are independently styrene and/or 2-ethylhexyl acrylate.

58. An aqueous polymer dispersion obtained by the process according to claim 12.

59. The aqueous polymer dispersion according to claim 20, wherein the amount of polymer A, polymer B1 and polymer B2 together in the aqueous polymer dispersion is more than 90 wt. % based on the solids content of the aqueous polymer dispersion.

60. The aqueous polymer dispersion according to claim 58, wherein the amount of polymer A, polymer B1 and polymer B2 together in the aqueous polymer dispersion is more than 60 wt. % based on the solids content of the aqueous polymer dispersion.

61. The aqueous polymer dispersion according to claim 58, wherein the amount of polymer A, polymer B1 and polymer B2 together in the aqueous polymer dispersion is more than 90 wt. % based on the solids content of the aqueous polymer dispersion.

62. An aqueous coating formulation comprising the aqueous polymer dispersion according to claim 12.

63. The aqueous coating formulation according to claim 62, wherein the amount of coalescent present in the aqueous coating formulation is less than 130 g/l.

64. A coated furniture obtained by applying the aqueous coating formulation according to claim 62 onto furniture, to form a coating thereon, and drying the coating.

* * * * *